(12) United States Patent
Jones et al.

(10) Patent No.: US 8,024,308 B2
(45) Date of Patent: Sep. 20, 2011

(54) ELECTRONIC PREVIOUS SEARCH RESULTS LOG

(75) Inventors: Scott A. Jones, Carmel, IN (US); Brad Bostic, Carmel, IN (US); Eugene M. O'Donnell, Fishers, IN (US); Thomas E. Cooper, Carmel, IN (US)

(73) Assignee: ChaCha Search, Inc, Carmel, IN (US)

( * ) Notice: Subject to any disclaimer, the term of this patent is extended or adjusted under 35 U.S.C. 154(b) by 0 days.

(21) Appl. No.: 11/835,016

(22) Filed: Aug. 7, 2007

(65) Prior Publication Data

US 2008/0033970 A1 Feb. 7, 2008

Related U.S. Application Data

(60) Provisional application No. 60/821,595, filed on Aug. 7, 2006.

(51) Int. Cl.
*G06F 7/00* (2006.01)
(52) U.S. Cl. ....................................... 707/705
(58) Field of Classification Search .............. 707/3, 705
See application file for complete search history.

(56) References Cited

U.S. PATENT DOCUMENTS

| | | | |
|---|---|---|---|
| 5,559,940 A | 9/1996 | Hutson | |
| 5,732,259 A | 3/1998 | Konno | |
| 5,772,446 A | 6/1998 | Rosen | |
| 5,809,250 A | 9/1998 | Kisor | |
| 5,875,231 A | 2/1999 | Farfan et al. | |
| 5,915,010 A | 6/1999 | McCalmont | |
| 6,198,904 B1 | 3/2001 | Rosen | |
| 6,411,950 B1 | 6/2002 | Moricz et al. | |
| 6,484,162 B1 | 11/2002 | Edlund et al. | |
| 6,507,841 B2 | 1/2003 | Rivereiulx de Varax | |
| 6,578,010 B1 | 6/2003 | Teacherson | |
| 6,662,178 B2 | 12/2003 | Lee | |
| 6,675,159 B1 | 1/2004 | Lin et al. | |
| 6,694,331 B2 | 2/2004 | Lee | |
| 6,766,320 B1 | 7/2004 | Wang et al. | |
| 6,895,406 B2 | 5/2005 | Fables et al. | |
| 6,901,394 B2 | 5/2005 | Chauhan et al. | |
| 2002/0091836 A1 | 7/2002 | Moetteli | |

(Continued)

FOREIGN PATENT DOCUMENTS

JP 2004-46670 2/2004

(Continued)

OTHER PUBLICATIONS

U.S. Appl. No. 11/647,286, filed Jul. 10, 2006, Scott A. Jones et al., Chacha Search, Inc.

(Continued)

*Primary Examiner* — Charles Rones
*Assistant Examiner* — Fazlul Quader
(74) *Attorney, Agent, or Firm* — Staas & Halsey

(57) ABSTRACT

A method for providing a viewable search results log to allow determination of the effectiveness of search strategies and sharing results of searches with others. The search results log reveals search strategies utilized by a human searcher with which the search results log is associated. The search results produced by at least one human searcher are stored in the search results log and presented according to a view format selected by a viewer. The search results log can be interrelated to other systems such as a blog or a search engine.

30 Claims, 15 Drawing Sheets

U.S. PATENT DOCUMENTS

| | | | |
|---|---|---|---|
| 2002/0133481 | A1 | 9/2002 | Smith et al. |
| 2002/0140715 | A1 | 10/2002 | Smet |
| 2002/0167539 | A1 | 11/2002 | Brown et al. |
| 2003/0014403 | A1 | 1/2003 | Chandrasekar et al. |
| 2003/0028896 | A1* | 2/2003 | Swart et al. ................ 725/127 |
| 2003/0061201 | A1 | 3/2003 | Greffenstett et al. |
| 2003/0140037 | A1 | 7/2003 | Deh-Lee |
| 2003/0145001 | A1 | 7/2003 | Craig et al. |
| 2003/0174818 | A1 | 9/2003 | Hazenfield |
| 2003/0198325 | A1 | 10/2003 | Bayne |
| 2004/0023644 | A1 | 2/2004 | Montemer |
| 2004/0024752 | A1 | 2/2004 | Manber et al. |
| 2004/0049541 | A1 | 3/2004 | Swahn |
| 2004/0062381 | A1 | 4/2004 | Shambaugh et al. |
| 2004/0162820 | A1 | 8/2004 | James et al. |
| 2004/0203634 | A1 | 10/2004 | Wang et al. |
| 2005/0055341 | A1* | 3/2005 | Haahr et al. ................ 707/3 |
| 2005/0086290 | A1 | 4/2005 | Joyce et al. |
| 2005/0105712 | A1 | 5/2005 | Williams et al. |
| 2005/0114299 | A1 | 5/2005 | Bharat |
| 2005/0119995 | A1 | 6/2005 | Lee |
| 2005/0120003 | A1 | 6/2005 | Drury et al. |
| 2005/0131866 | A1 | 6/2005 | Badros |
| 2005/0136949 | A1 | 6/2005 | Barnes, Jr. |
| 2005/0160107 | A1 | 7/2005 | Liang |
| 2005/0165742 | A1 | 7/2005 | Chin |
| 2005/0165777 | A1 | 7/2005 | Hurst-Hiller et al. |
| 2005/0198021 | A1 | 9/2005 | Wilcox et al. |
| 2005/0210042 | A1 | 9/2005 | Goedken |
| 2005/0278317 | A1 | 12/2005 | Gross et al. |
| 2005/0289124 | A1 | 12/2005 | Kaiser et al. |
| 2006/0010105 | A1 | 1/2006 | Sarukkai et al. |
| 2006/0015498 | A1 | 1/2006 | Sarmiento et al. |
| 2006/0020593 | A1 | 1/2006 | Ramsaier et al. |
| 2006/0026147 | A1 | 2/2006 | Cone et al. |
| 2006/0026152 | A1 | 2/2006 | Zeng et al. |
| 2006/0064411 | A1 | 3/2006 | Gross et al. |
| 2006/0070012 | A1 | 3/2006 | Milener et al. |
| 2006/0074984 | A1 | 4/2006 | Milener et al. |
| 2006/0100956 | A1 | 5/2006 | Ryan et al. |
| 2006/0122991 | A1 | 6/2006 | Chandrasekar et al. |
| 2006/0224579 | A1* | 10/2006 | Zheng ................ 707/5 |
| 2007/0005344 | A1 | 1/2007 | Sandor et al. |
| 2007/0061332 | A1* | 3/2007 | Ramer et al. ................ 707/10 |

FOREIGN PATENT DOCUMENTS

| | | |
|---|---|---|
| WO | WO 03/056467 | 7/2003 |
| WO | WO 2006/026579 | 3/2006 |

OTHER PUBLICATIONS

U.S. Appl. No. 11/469,732, filed Jul. 10, 2006, Scott A. Jones et al., Chacha Search, Inc.
U.S. Appl. No. 11/779,502, filed Jul. 18, 2007, Scott A. Jones et al., Chacha Search, Inc.
U.S. Appl. No. 11/780,241, filed Jul. 19, 2007, Scott A. Jones et al., Chacha Search, Inc.
U.S. Appl. No. 11/780,329, filed Jul. 19, 2007, Scott A. Jones et al., Chacha Search, Inc.
"Eurekster Swicki Home", retrieved from Internet URL: http://eurekster.com on Sep. 25, 2007.
"Google—Web History".
"NoodleBib User's Guide", NoodleTools, Inc, Palo Alto, CA, Aug. 13, 2007.
U.S. Appl. No. 11/647,286, filed Dec. 29, 2006, Scott A. Jones et al., Chacha Search, Inc.
U.S. Appl. No. 11/469,732, filed Sep. 1, 2006, Scott A. Jones et al., Chacha Search, Inc.
International Search Report issued Jan. 28, 2008 in PCT/US07/75369.
International Search Report issued Feb. 12, 2008 in PCT/US07/60467.
International Search Report issued Feb. 27, 2008 in PCT/US07/60459.
International Search Report issued Feb. 15, 2008 in PCT/US07/60468.
International Search Report issued Feb. 7, 2008 in PCT/US07/60472.
Carmel et al., "Searching XML Documents via XML Fragments," 2003, ACM, pp. 151-158.
Karat et al., "Patterns of Entry and Correction in Large Vocabulary Continuous Speech Recognition Systems," 1999, ACM, pp. 568-575.
Google Tutor, "Googling from your Mobile Phone-no Web Browser Needed!," 2005, Google Tour.
Varshney et al., "Voice Over IP," 2002, Communications of the ACM, vol. 45, No. 1, pp. 89-96.
Knoblock, Craig A., "Searching the World Wide Web," 1997, IEEE Expert, pp. 8-14.
Sullivan, Danny, "Google Launches Personalized Home Page," Search Engine Watch, May 2005.

* cited by examiner

SEARCH PROCESS RECORD

200

| | Description | Example Content(s) |
|---|---|---|
| 202 | SSID | Session 1100227 |
| 204 | QUERY | 'E-mail Marketing Companies' |
| 206 | USERID | Market 101 |
| 208 | SEARCHERID | EmailGuy1 |
| 210 | RESULTS | 'ExactTarget.com' ; 'mail2u.com' |
| 212 | RESOURCE(S) | 'HarvardBusinessReview.net' ; 'google.com' |
| 214 | KEYWORD(S) | 'email marketing' ; 'marketing companies' ; 'email' ; 'marketing' ; 'companies' |
| 216 | CATEGORY(IES) | Business > Marketing |
| 218 | RATING | 5 (sessions), Expert-1 (searcher) |
| 220 | COMMENTS | |
| 222 | CHRONO DATA | Start Session 1:40P; 12/27/07; result 1 - 1:41P; result 2 - 1:45P; End Session 1:46P; 12/27/07 |
| 224 | CHAT | "Welcome to ChaCha" ... |

FIG. 2

| KEYWORD — 290 | DATE / TIME — 292 | CATEGORY — 294 |
|---|---|---|

255
- SSID: Session 1100227
- QUERY: 'E-mail Marketing Companies'
- USERID: Market 101
- SEARCHERID: EmailGuy1
- RESULTS: 'ExactTarget.com' ; 'mail2u.com'
- RESOURCE(S): 'HarvardBusinessReview.net' ; 'google.com'
- KEYWORD(S): 'email marketing' ; 'marketing companies' ; 'email' ; 'marketing' ; 'companies'
- CATEGORY: Business > Marketing
- RATING: 5 (sessions), Expert-1 (searcher)
- CHRONO DATA: Start Session 1.40P; 12/27/07; result 1 - 1.41P; result 2 - 1.45P; End Session 1:46P; 12/27/07
- CHAT: 'Welcome to ChaCha' ...

260
- SSID: Session 1111227
- QUERY: 'Email Marketing Best Practices'
- KEYWORD(S): 'email marketing' ; 'marketing companies' ; 'email' ; 'marketing' ; 'companies'

265
- SSID: Session 1111337
- QUERY: 'Viral Email Marketing'
- KEYWORD(S): 'email marketing' ; 'marketing companies' ; 'email' ; 'marketing' ; 'companies'

ELECTRONIC PREVIOUS SEARCH RESULTS LOG

CROSS-REFERENCE TO RELATED APPLICATION

This application is related to and claims the benefit of priority to, Provisional Application U.S. Ser. No. 60/821,595, entitled ELECTRONIC PREVIOUS SEARCH RESULTS LOG, by Scott A. Jones, filed Aug. 7, 2006, and application Ser. No. 11/336,928, entitled "A Scalable Search System using Human Searchers", by Scott A. Jones, filed on Jan. 23, 2006, in the U.S. Patent and Trademark Office, the contents of both of which are incorporated herein by reference.

BACKGROUND

The embodiments described herein relate, generally, to information search systems, and more specifically, to information search systems in which human searchers are employed to provide information seekers with responses to their information search queries.

DESCRIPTION OF THE RELATED ART

In a search system utilizing human searchers, there are often many human searchers or guides to accommodate the information search requests of information seekers. Such an accommodation can be of the utmost importance to prevent or minimize frustration of the information seekers. As the number of human searchers can be large, several problems arise in such a system.

For example, as the number of human searchers increases, management of the performance of the human searchers can often be difficult, as there are many human searchers for which performance has to be monitored. It is often very time-consuming for the management of such a system to monitor the performance of each guide or provider. As the providers perform their work in real-time, monitoring of their performance typically must occur in real-time. For example, if a human searcher is answering a search query (request) during time interval t0, the effectiveness of his or her strategy must often be measured during t0, that is, during the time of the actual searching. If performance is measured at a later time after the search is completed, management is left with mere surface-type performance indicators such as total time for search completion or subjective feedback from an information seeker (requester). While such factors can be useful, they are often not as useful as more concrete measures of performance relating to efficiency such as exactly what strategy was utilized by the human searcher to conduct the search, or what resources the guide used to find information.

In addition to the above-identified problem, although each of the many human searchers responds to multiple information search queries, some of the queries relate to each other. The number of human searchers can be large so information is typically not shared among the human searchers. Human searchers often do not communicate effectively due to multiple factors such as, for example, geographical distance, time constraints, unawareness of other searchers with similar interests, etc.

A human searcher may field an information search query similar to an information search query previously fielded by another human searcher. Although the human searcher could possibly benefit from having access to the search strategy of the previous human searcher, typically, no such benefit occurs, as communication between the searchers does not occur. As searching by the human searchers occurs in real-time, the later searcher cannot determine the search strategy employed by previous human searcher(s). Such an effect can result in system inefficiency, as "reinvention of the wheel" or repetition of precisely the same search can easily occur.

Finally, although a system utilizing human searchers can produce a more relevant and better overall result, failure to interrelate such a system with other systems often results in missed opportunities for information gathering and marketing.

SUMMARY

In light of the foregoing, what is needed is a method for providing a previous search results log associated with a human searcher and/or user. The previous search results log should be capable of interoperability with other systems such as those involving a blog, a search engine, webpage or other client-server based systems.

A system providing a viewable previous search results log (or search process log) to allow determination of the effectiveness of search strategies, sharing results, search resources, and the information of the searcher, search query, user, and other associated information is needed. The search process log reveals search methods, resources, utilized to respond to query by a human searcher(s) with which the log is associated. A record containing relevant information used in producing a search result(s) in response to a user query by at least one human searcher are stored in the log and presented according to a viewing format selected by a viewer application which may be resident on the search system, or on a local application in a user system, such as a browser or other application which may interpret the information in the search process log database. Thus the search process log can be interrelated with other systems such as a blog or a search engine.

The system allows human searchers and/or users to annotate the search process records of other human searchers so that the human searchers can provide each other with feedback such as alternative search resources, methods for improved query formulation, training materials relevant to the query, rating of results, etc., thereby enhancing the speed, efficiency and quality of the search results.

The speed, efficiency, quality, strategy and other performance of human searchers can be monitored and modified using various rating methods. The data contained in the search process log may be presented to users, guides, and/or system administrators to allow review, rating, annotation, etc. of the data therein. This may be used to review the results, identify resources and strategies which may be shared with other searchers, identify training materials for a searcher(s) associated with the search process record, and otherwise communicate with a searcher or user accessing the search process log.

BRIEF DESCRIPTION OF THE DRAWINGS

Aspects and advantages of the embodiments will become apparent and more readily appreciated from the following description of the embodiments, taken in conjunction with the accompanying drawings, of which:

FIG. 2A is an exemplary display interface for review of a data structure of a previous search results log including entries representing information from search sessions.

FIG. 2B is an exemplary data structure.

DETAILED DESCRIPTION OF THE PREFERRED EMBODIMENTS

Figure 1:
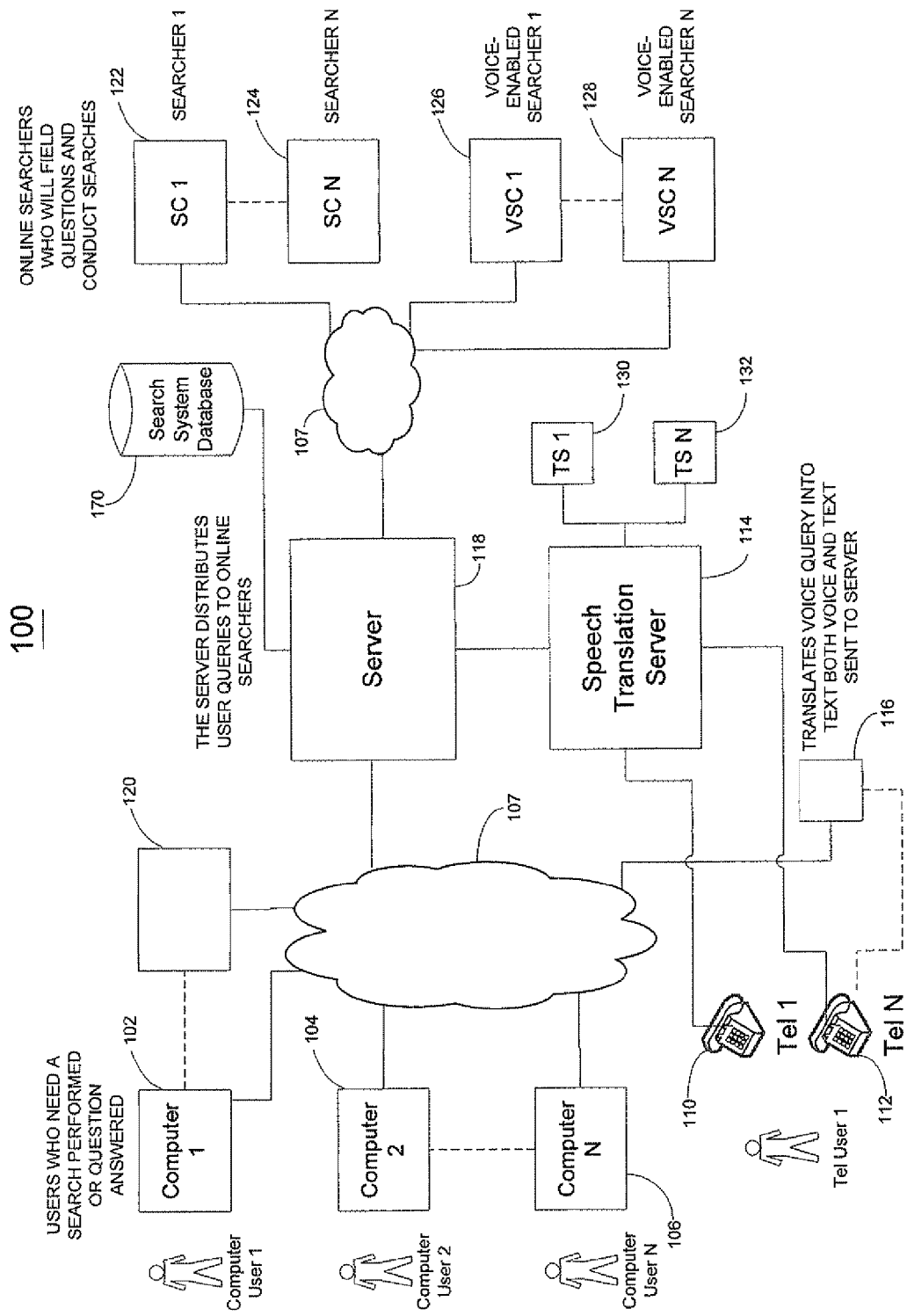
FIG. 1 is a system diagram illustrating the various components of a human search system.

Reference will now be made in detail to the embodiments described herein, examples of which are illustrated in the accompanying drawings, wherein like reference numerals refer to like elements throughout.

As illustrated in FIG. 1, guides or human searchers such as the human searcher at the searcher computer system 122, for example, are human searchers who offer services provided by a provider of the embodiments described herein to perform searches on information queries submitted by a computer user, for example, information seeker computer 102 as described in more detail in U.S. application Ser. No. 11/336,928, entitled, "A Scalable Search System Using Human Searchers", by Scott A. Jones, filed Jan. 23, 2006 and incorporated herein by reference.

The embodiments described herein include a system 100 that allows queries by users or information seekers (InfoSeeker™), such as a worker, a housewife or a child, to be fulfilled by human searchers to provide the information seekers with search results. The human searchers (guides or providers) may be professional paid searchers (PaidSearcher™), amateur and/or volunteer searchers. For example, a query (which, throughout this description, may entail a fully-formed question/sentence, a keyword, a list of keywords or a search phrase as previously discussed) might request, for example, information of the closing time of a particular restaurant, the winner of the 1960 World Series, or information regarding a medical illness (or any other type of query). As depicted in FIG. 1, a query(ies) can originate from user computer systems 102, 104, 106 and may be received over a communication system 107 or may originate from telephone handsets 110, 112 and be received by the server 118 via the voice translation server 114. The user computer systems can be a typical desktop or laptop system, a handheld computer such as a personal digital assistant (PDA), a basic cellular telephone, a text-enabled cellular telephone, a specialized query terminal, or any other source that allows a user to enter a query via text, image or speech entry. (NOTE: the words "speech" and "voice" are used interchangeably in this discussion). The telephone handsets may be typical touch-tone telephones, cellular telephones, two-way radios or any other communication device that allows the user to communicate over a distance. The communication system 107 may include packet switched facilities, such as the Internet, circuit switched facilities, such as the public switched telephone network, radio based facilities, such as a wireless network, etc.

The oral speech queries by telephone handsets 110, 112 may be stored in the system database 170 and/or converted into digital text queries by the speech translation server 114. Alternatively the user computer systems 102, 104, 106 or telephone handsets 110, 112 may perform this processing. The speech translation server 114 may handle the task of translating the speech into text, possibly by interaction with other systems, or it may perform the task locally. It may perform speech to text conversion by using either speech transcription using human transcribers or using conventional speech-to-text processing, also known as automatic speech recognition (ASR). The speech queries can originate from a user's telephone and can be handled initially via automated attendant speech prompt type processing (or alternatively via an interactive speech response or IVR system) to obtain the user's query.

The speech translation server 114 keeps track of the port from which the call originated and assigns a user identifier to the user telephone handsets 110, 112 on this port for a particular session. The system 114 can prompt a user to speak a query. A speech query(ies) can also originate from the source 116 called a "speech query service requestor" (SQSR) rather than directly from a user, such as a private or public information provider. For example, a speech query can be initially processed by a public library telephone system and switched to the speech translation server 114. The speech query may physically arrive at the system via a variety of input means, including time-division multiplexed lines, voice over Internet protocol (VoIP) packets from an Internet connection, and/or other sources. A speech query may arrive as a stream, packet or series of packets.

Similarly, a commercial site, such as a grocery store ordering system where a requester can order food and may inquire about recipes for a special after-dinner dessert can initially process a speech query and pass it along to the speech translation server 114.

The SQSR 116 may communicate with the speech translation server 114 via a variety of mechanisms including an IP-based socket address or via a Microsoft®.NET service, making the translation services of the speech translation server 114 widely available via the Internet to any application that wishes to use them.

A packet can then be processed locally at the speech translation server 114 to convert it from digitized speech into text or, alternatively, it may be processed by a remote system. If the digitized speech is being transcribed by human transcribers, this can be accomplished by sending digitized speech to one or more transcriber systems (TS) 130, 132 where human transcribers can hear the speech, for example via headphones or speakers, and transcribe the information by typing text into a computer system, so that the text is then sent back to the speech translation server 114 (or alternatively, directly to the server 118 or to the SQSR 116), all within a matter of seconds (preferably less than 10 seconds after the user has finished speaking a query). To speed up processing, a speech query can be and typically is preferably broken up into a stream of packets and passed to a transcriber, without interruption, as it is being spoken by a user, thereby allowing for reduced latency in the system. Preferably, there are many more transcribers available in the system than there are instantaneous queries so that delays are not induced into the system. In the case of an overflow of queries, a form of flow control may be utilized by telling some callers that they must hold on the line for an available transcriber (which might be described to the caller as holding for an operator or agent). Preferably, the speech translation server 114 maintains a database of transcribers that are currently logged-in and available to perform the service of transcription using a transcription software application on their transcription system (e.g., the transcriber systems 130, 132). Alternatively, the function of tracking availability of transcribers might be located on a remote system and/or might be implemented using a distributed mechanism among the transcriber systems 130, 132 for example, using peer-to-peer (P2P) mechanisms.

The speech translation server 114 may feed continuous sequential speech phrases from various and different sources (e.g., users) to any given transcriber (e.g., the transcriber system 130). Hence, a transcriber is sequentially transcribing, in rapid succession, speech messages from various speakers and creating separate text packets that may be associated with a speech message.

Once a query is in digital text form, it is provided to the server 118. The text entry features of cellular telephones can also be used to enter a query in digital text form allowing a user(s) to submit queries textually from a telephone(s).

A query(ies) from a graphical user interface (GUI) of the user computer systems 102, 104, 106 can originate directly from a user, or like a speech query(ies), indirectly through a "text query service requestor" (TQSR), which may be any software application or device connected via the Internet, for example. As with a speech query, a user may be on a grocery store website ordering food for delivery and may inquire about a recipe for a special dessert. A recipe query would be forwarded to the server 118. A website, consumer electronics device, or other device may become a TQSR or SQSR for performing a search. For example, a set top box offered by a satellite TV or Cable TV provider could offer the ability to enter a query string and act as a TQSR or SQSR. A software application running on a PC, such as Microsoft® Office Word or Excel®, may also serve as a TQSR or SQSR.

An appropriate interface, such as a graphical user interface (GUI) for the computer system 102 or speech prompt system in the speech translation server 114 extracts a query from a user and transmits a query to the server 118.

A query may include information of a user or user device which may help the system 100 to better fulfill a request of a user, which may include geographic information such as area code, IP address, GPS location, a user "cookie", or other information.

Upon receipt of a query, such as from user computer system 102 for example, the server 118 can provide information (e.g. advertisements) to a user for a user to see or hear while a search is being processed. The information can be related to a query, keyword(s), category(ies) of a query, etc. and may include video and/or audio information as appropriate for a user device and/or for a source of a query, such as a grocery store ad in the recipe example. The information can include advertisement(s), information such as video, music, games, web links, etc. that may interact with and/or be displayed for a user while a search is being performed. Information provided may serve as a source of revenue for the system 100, for example through advertising. If a user views an ad, clicks on a link, and/or purchases a product (sometimes referred to as "conversion") related to an advertisement while awaiting results of a search, the search system database 170 may be updated to reflect additional ad revenue with a credit of points and/or compensation, if appropriate, to a searcher. A digital text, graphic(s), audio, and/or video advertisement(s) may be presented on a user computer (e.g., user computer system 102) or a user telephone (e.g., telephone handset 112). A particular advertisement(s) selected may be based on a weight associated with an advertisement(s) based on single or combined factors such as advertiser contract commitments, bidding price of advertisers, popularity with users, keyword mapping to advertisements, statistical usage (e.g., least recently presented), user demographics, searcher choice of advertisement, etc.

The server 118 processes a query(ies) by determining which providers are available to fulfill an information search request, based upon factors such as a guide being logged-in, a keyword, category, ranking or other information associated with a searcher.

The server can also determine if a query may have been fulfilled previously and may send a response to a user using a previous search result(s) without utilizing a human searcher.

If no previous query results satisfying or that may satisfy a request are available, the server 118 sends a query to a searcher(s) over the communication system 107. If a query is a speech query, in addition to sending a text version of a query, keyword(s), category(ies), a speech record of a query, etc. may be transmitted. A human searcher may be located at the searcher computer systems 122, 124 and/or speech-enabled searcher computer systems 126, 128.

A searcher(s) may review a query, including keyword(s), category(ies), speech recording(s), etc. and may decide to accept a search. When a searcher accepts a search task, a notification may be sent to a user who originated a query through the server 118. A notification may be sent to a user device, or to a device designated by a user. Because a search may require clarification, a searcher may send a clarification request to a user. This may be sent through the server 118 or via direct link to a user via the communication system 107. A user may reply with a clarification, information or a revised query. A searcher may use a searcher computer system (e.g., 122, 126) to perform a search of available information to produce a search result(s). For example, a searcher may use conventional tools, such as a browser, to access a public database(s) via a search over the World Wide Web or a private database(s) accessible only to a searcher, such as a database of information previously gathered by a searcher, from results stored on the server 118 from a searcher(s), from a database(s) that may require payment for access, information available to the searcher in non-electronic form, such as a book on the searcher's bookshelf, test results from a personal experiment, etc. A searcher may submit a search query, or a version of it to an automated search tool such as Google® or Ask Jeeves®. A search result(s), such as an answer, comments by a searcher, webpage(s), web link(s), related information, etc. may be obtained by a searcher performing a search. A search result(s), such as a webpage(s), link(s) which a user may review or may use to obtain information, an answer to a question, webpage(s), link(s) to webpage(s) to support an answer, etc., may be transmitted back to a user through the server 118 or directly to a user via the communications system 107. The information returned may be any information a searcher can locate which may satisfy a request of a user. The information may include anything that could satisfy a user such as a document, a video, a song, a configuration file, pictures, links, etc.

A search result(s) is presented to a user in real-time, associated with an amount of time it may take to locate a searcher and perform a search. A searcher(s) is preferably identified within 15 seconds and a searcher preferably begins performing a search within 15 seconds. Depending on the nature of a request, a search may require a few seconds to a few minutes. The server or a search tool may interact with a user automatically via the chat session (or via the VoIP connection) in order to indicate to a user that progress is being made. An indication might be as simple as a dot typed on a user display or an automated text or voice message. A user may preferably be presented with an advertisement(s), but during a silent period(s), user interaction may occur via speech such as having a searcher and/or an automated speech system say, "Please continue to hold while your search is being performed". A searcher(s) may interact with a user, either of his or her own accord or the searcher tool may remind a searcher to give status to a user. A searcher may also send a partial result(s) to a user so that a user may review a result(s) during a search. The server 118 stores a query and a search result(s) for matching with a future query(ies).

A human searcher may transmit a search result(s) and other information to an information seeker(s) using the embodiments described herein. The system 100 may maintain a log of search result(s) provided by a human searcher(s) and other data associated with the search process in the search process log of the search system database 170. In at least one embodiment, such a log is maintained in the form of a database, that is, a search process database or record or log.

A search result(s) produced by at least one human searcher or guide may be stored in a search process log in the search system database 170 and may be presented according to a viewing format selected by a viewer application.

Figure 2:
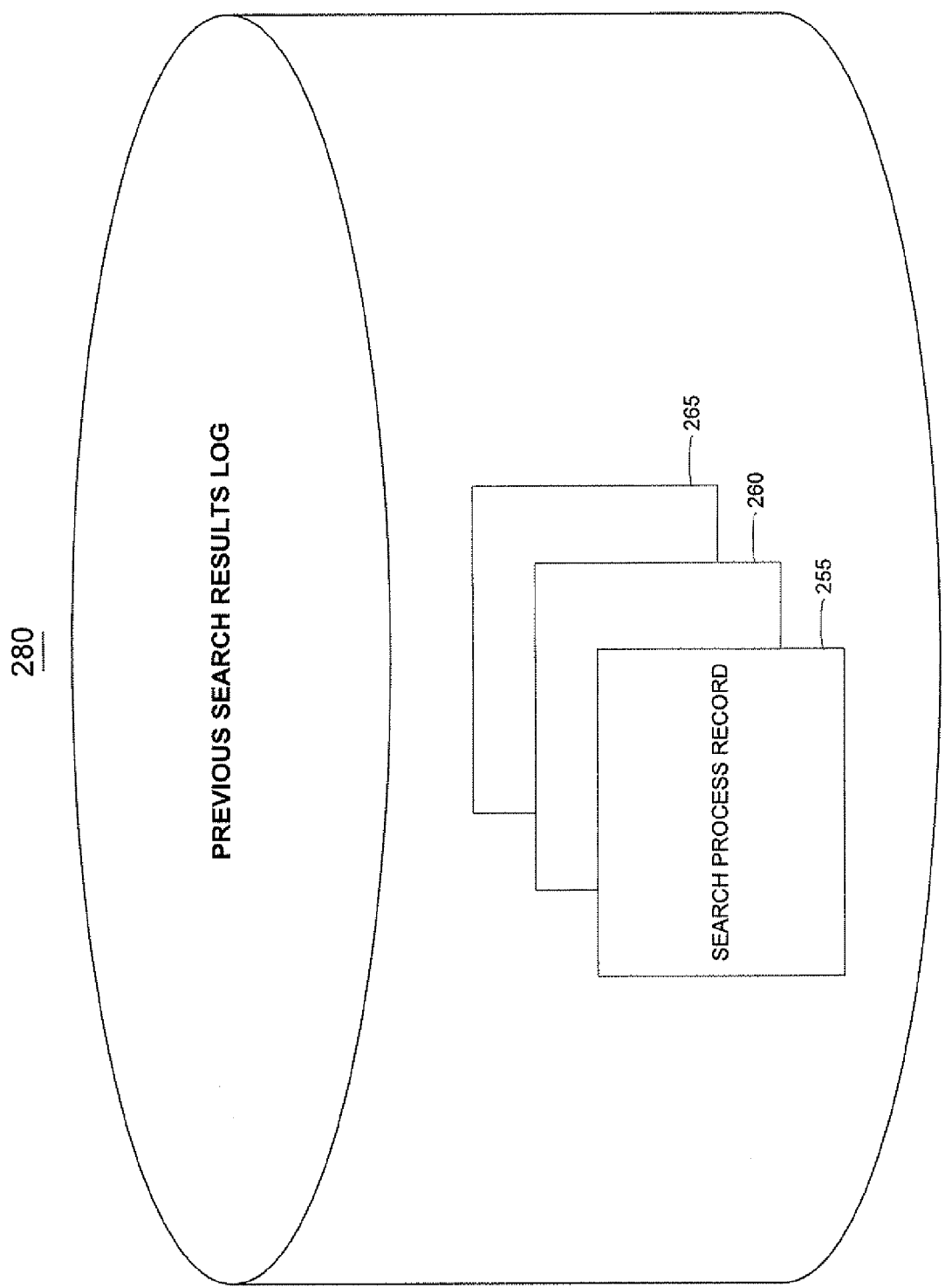
FIG. 2 is an exemplary data structure of a search process record.

An exemplary search process record 200 is illustrated in FIG. 2. A search process record 200 may include a search session ID field 202, search query field 204, a user ID field 206, a searcher ID field 208, a search results (SSID) field 210, a search resource(s) field 212, a keyword(s) field 214, a category(ies) field 216, a rating field 218, a comments field 220, a chronological data field 222, a chat interaction field 224, and other fields. A search process record may be created for various types of search sessions, such as an interactive search session with a user, a non-interactive training session, a collaborative search session by multiple searchers, etc. both real-time and non real-time communication sessions may be recorded. Preferably, results and other data are recorded in real-time for a live search session.

The search session ID field 202 contains a unique identifier of the search session. The content of the search session ID field serves to identify a search process record associated with one search session from the search process record associated with other search sessions.

The search query field 204 includes information of the original query submitted by a user (e.g., "1960 World Series winners"). It may contain further modified query information (e.g., "who was the winning pitcher in the deciding game of the 1960 World Series") which may have been created as part of the search process.

The user ID field 206 contains information identifying the user(s) associated with the query submitted for searching (e.g., 'User Bob 1133'). In a preferred embodiment the field includes a unique identifier of the user which is used consistently. However, the user ID may also be associated with a "cookie", or other device ID of a user such as a telephone number, etc. and may be based on a random number.

The searcher ID field 208 contains information identifying the searcher(s) who performed the search process. It may contain text, numeric and/or character fields. In a preferred embodiment, the searcher ID contains a unique identifier of the searcher which is preferably used consistently and may be based upon a random number.

The search results field 210 contains information of a search result(s) provided by a searcher(s) in response to the query(ies) contained in the search query field 204 (e.g., 'the New York Yankees'; 'Sandy Koufax'). In at least one embodiment, the search query field and the search results field are linked, for example by a pointer to indicate which search result is associated with a query.

The search resource(s) field 212 contains information of the resources utilized by a searcher(s) in the search process. It may contain data such as a URL (e.g., 'www.baseballtrivia.com') or other information of a resource utilized by a searcher to obtain a search result(s).

The keyword(s) field 214 contains information of a keyword(s) which may have been associated with a query as part of the search process. The category(ies) field 216 contains information of a category which may have been associated with the query as part of the search process.

The rating field 218 contains information of ratings associated with the search process record. The rating field may contain ratings of various items within a search results log, which are associated with the item via pointer in at least one embodiment. For example, a rating may be applied to a result associated with a query, a rating may be associated with a searcher for the particular search process (e.g., example a user rating, or a trainer rating for the session), etc.

The comments field 220 contains information of comments or annotations which may be annotations of the search process record by a searcher(s). For example, a trainer may review a search process record and add comments regarding alternate resources, ratings of the searcher, etc. Such information may also include information of the person who performed the annotation.

The chronological data field 222 contains time-related information regarding the search process record, For example, a time stamp may indicate when a query is submitted, a time stamp might be included indicating when a particular search result(s) is returned to a user. The chat interaction field 224 may include any or all interaction between a searcher and an information seeker which was used to clarify the content of an original query.

FIG. 2A depicts an exemplary GUI 250 for review of information from one or more search process records. For example, as illustrated in FIG. 2B, information from a first search process record 255 is displayed in the tab labeled 'email marketing companies' information from a second search process record 260 is displayed in the tab labeled 'email marketing best practices' and information from a third search process record 265 is displayed in the tab labeled 'viral email marketing'. The GUI 250 allows a user to review and determine the effectiveness of the search strategy of a human searcher and allows searchers to share information pertaining to search strategies. As a result, some of the information sharing problems occurring heretofore in systems employing human searchers, such as those identified above, may be prevented or minimized.

For example, the first search process record 255 can pertain to a query relating to companies that provide email marketing services (e.g., 'email marketing companies'). The second search process record 260 can pertain to a query relating to email marketing best practices (e.g., 'information on email marketing best practices'), and the third search process record 265 can pertain to a query relating to viral email marketing (e.g., 'how can we do viral email marketing').

In at least one embodiment, the search results produced by at least one human searcher are stored in a search process record(s) in a previous search results log in the search system database 170 (FIG. 1) and can be presented according to a view format selected by a viewer. The storing can include recording the search results as the search results occur, that is, recording the search results in real-time. Presentation of the search results can include organizing and presenting the search results sorted according to a selected view format including but not limited to chronological order format keyword format, category format, etc. based upon fields contained in the search process record(s) 200.

It should be noted that the presenting operation can include organizing the search results according to at least two fields in the search process record(s), for example, time/date and keyword. The presenting can also include organizing the search results according to searchers, rating(s), resources, results, users, etc. Any of which may be used as a key for sorting and displaying the content of the search process record(s) 200. As will be explained further, not all fields from a search process record(s) may be presented in a viewer format.

In at least one embodiment, each search process record in the search system database 170 includes a common set of fields, such as those described above. As a consequence a viewer application, such as a browser or other application which may be present on the server 118 (FIG. 1) may display any or all of the content of the search process record(s) sorted according information contained in the search database 170. Other relevant fields may be added to the search process records in the annotation process and/or rating process, etc.

For example, in using the GUI as depicted in FIG. 2A, in at least one embodiment of the invention, a viewer of a search process record(s) 200 can select to view the previous search results log according to chronological order format by depressing electronic 'date/time' button 292 of the GUI 250. The search process record information might then be displayed and sorted according to the search session start time, for example. In such an instance, the records may be sorted according to date and/or time created as recorded in the chronological data field 222 of the search process record 200. The search process record with the earliest start time will be listed first in the display of the GUI 250. For example, if the first search process record 255 includes a search result returned by a particular human searcher on Mar. 1, 2006 and the second search process record 260 includes a search result returned by a particular human searcher on Apr. 1, 2006, the first search process record 255 will be presented to the viewer of the previous search records before the second search process record 260, if the viewer selects an oldest to most recent chronological view format.

Similarly, if the third search process record 265 was created after the first search process record 255 and the second search process record 260, the third search process record 265 will be presented in the GUI 250 after the first search process record 255 and the second search process record 260.

Should an instance arise in which two or more search process records in the search process database were created at the same time on the same date, the search process record information could be presented in any arbitrary order such as search session ID or alphabetical by searcher (for unfiltered views, etc.). Preferably the user can select a secondary sorting field(s) in such cases.

As an alternative to electing a view by chronological order, the viewer may select to view the search process records according to keyword or category by depressing electronic 'keyword' button 290 or electronic 'category' button 294, as will be described below herein in the text corresponding to FIGS. 3 and 5. In such an instance, after depressing the electronic keyword button 290, for example, the search process record information is automatically sorted by keywords, and the viewer can use the scroll bar 296 to scroll up and down until the viewer locates the desired keyword.

In accordance with an aspect of the embodiments described herein, when the log is sorted by, for example, keyword using the keyword "NCAA Basketball", the search results entries pertaining or relating to the keywords "NCAA Basketball" are presented together, for example, one after another in chronological order. In particular, if the human searcher answered a query on Mar. 1, 2006 such as, "Who won the NCAA tournament in 1988?" and answered another query related to the 2000 NCAA tournament, both queries could be displayed together, that is, one after the other, as both queries might be associated with the same keyword, i.e., "NCAA Basketball".

Referring again to FIG. 2A, it should be noted that more than one entry related to email marketing companies, for example, may be included in the previous search results log. In such an instance, if the viewer elects to view the log sorted according to keywords, the entries relating to the "email marketing" keyword are viewed together. If, however, the viewer elects to display the log according to chronological view, the log is sorted by creation date and is displayed according to the order in which the entries were created, regardless of keywords. It should be further noted when utilizing the chronological view a variety of types of entries may be illustrated. For example, a mixture of entries pertaining to a variety of keywords and a variety of categories can be displayed in the chronological view format.

Similarly, the viewer may select to view the previous search results log 280 (FIG. 2B) according to category. Thus, if a first search process record includes a response to the query, "Who wore number 42 for the New York Giants in 1990" and a second search process record includes a response to the query, "Who won the Heisman Trophy in 1996?", the first and second search process records might appear grouped together and would appear one after the other as both search results might relate to the same category, that is, 'Sports>American football'.

Other view formats can be utilized in the embodiments described herein. For example, in at least one embodiment, the log can be viewed according to the guide performing the search, that is a guide or searcher format. In such an instance, the displayed entries from the log could all utilize information contained in search process records associated with a specific searcher(s) or guide.

After being presented with the disclosure herein, one of ordinary skill in the relevant art will realize that search process record(s) 200 can include additional information about search results without departing from the spirit and scope of the embodiments described herein.

In an aspect of the embodiment, a viewer of the previous search results log 280 may be presented with a slogger's (the human searcher to which a log is associated) performance information for a particular keyword after selecting a link involving the keyword.

In an aspect of the embodiment, each element in a previous search results log entry can be rated. In such an embodiment, each previous search results log entry may appear ordered according to its rating or ranking. When rating sorting within a keyword is desired, a conventional sort on rating followed by a keyword sort can be performed. For example, a viewer may select to review records sorted by keyword, and then sorted by rating of the search session. In this case, the records would appear grouped by keyword, and sorted from highest to lowest session rating. Thus a person viewing information from the previous search results log could review highly rated sessions for a given topic.

Other fields or subsections may be included within the previous search results log. For example, the log may also include a field indicating blogs associated with a given category or keyword, which may have been added by the searcher during the search, or by reviewers during annotation.

The information displayed in the GUI 250 is not limited to information in the original search process record. As each element of the record (e.g., user, searcher, resource, result(s), query, etc.) may have a unique ID assigned to it, it may be annotated and accessed based on information in the search process record(s) 200. As a consequence a query and a result(s) may be rated for relevance and that rating will be associated with the search process record. Thus a subsequent viewer of the search process record may be able to view ratings of the items in a search session which were created after the original search session. In this way, a reviewer may be better able to evaluate the performance of a searcher. Further, as each search session record may contain information of the searcher(s), and the user(s) it is possible to communicate anonymously with the user and/or the searcher using the information in a search session record (e.g., the search process record 255).

For example, as illustrated in FIG. 2, the information seeker may have desired to obtain some information on the best email marketing companies by submitting a search query such as, "What are the best email marketing companies?." The query is stored or recorded in the search query field 204 of a search process record 200 preferably in real-time.

The start time of the session may be recorded in the chronological data field 222. For example, if the information seeker submitted the query on 2:15 PM EDT, Oct. 29, 2005. The chronological data field 222, may include '2:15 PM EDT, Oct. 29, 2005, start'.

If a different or the same human searcher happened to view the previous search results log entry of the first human searcher who produced results and realized that another source or tool could have been used to more efficiently or more rapidly answer the query, the human searcher could annotate the search process record 200 of the first human searcher (if qualified to do so) and add information to the search process record. For example, a rating and/or experience level might be required to be allowed to annotate a search results. In such an instance, the date on which the search process record was edited may be indicated in the chronological data field 222 (e.g., 'resource info added by searcher FredS 1133 1:45 PM, Nov. 10, 2005'). This is an example of how the search process record(s) 200 allows the human searchers or guides to share search information and strategies, thereby allowing the human searchers to enhance their information search skills and improve reliability and accuracy of the overall system.

The search resource(s) field 212 includes search resources used to produce a search result(s) by a human searcher in response to a query submitted by an information seeker. For example, if the human searcher utilized resources such as the National Football League's (NFL®) website or a sports trivia website produced by another private entity, the information obtained and the source of the information could be included in the search resource(s) field 212. In particular, in such an instance, the search resource(s) field 212 could indicate that the human searcher first visited the NFL's website and searched online records pertaining to team rosters. The Uniform Resource Locator(s) (URL) accessed by the human searcher may be contained in the search resource(s) field 212 in at least one embodiment.

As a human searcher fielding a search query works to obtain a satisfactory response to the submitted query, the embodiments described herein record the activity of the human searcher in the search process record(s) 200.

Figure 3:
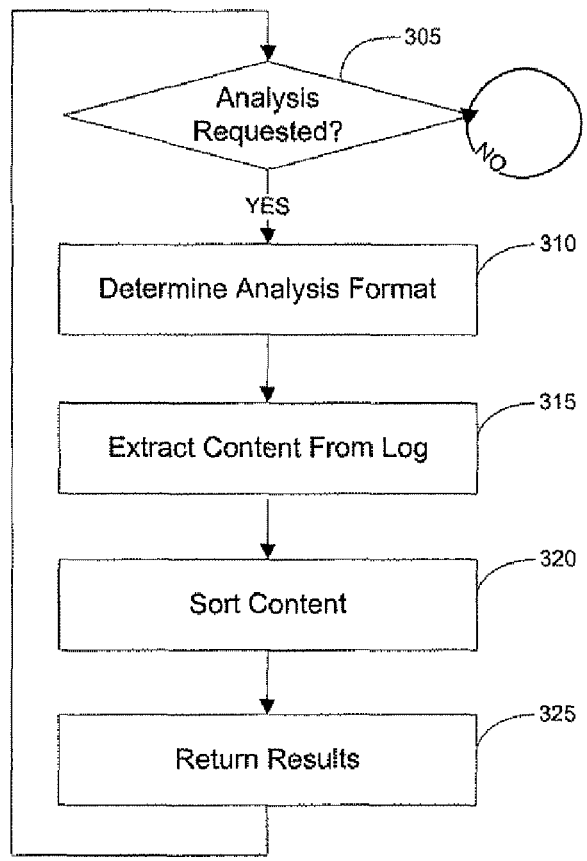
FIG. 3 is a flow diagram illustrating a method for presenting contents of a previous search results log.

As illustrated in FIG. 3, a flow diagram is provided in which the previous search results log 280 (FIG. 2B) can be viewed according to a particular format. The method 300 may be implemented on the server 118 (FIG. 1).

In operation 305, a determination is made regarding whether a previous search results log analysis is requested. For example, in at least one embodiment, an electronic "sort" or "view format" button can be depressed, thereby indicating to the system 100 (FIG. 1) that a previous search results log analysis is requested. If it is determined that a request has not been received, method 300 continues to wait for a request. If it is determined that a request has been received, control is passed to operation 310 and method 300 continues.

In operation 310, the sort or format type selection is received. For example, in at least one embodiment, the sort or format type includes a keyword sort format, a category sort format, and a date/time sort format. For example, if the viewer desires to view the previous search results log according to keyword, the user selects the keyword sort (for example, keyword button 290 (FIG. 2A), thereby allowing the system to receive the sort type selection in operation 310. After a format for sorting is determined, control is passed to operation 315 and method 300 continues.

In operation 315, content is extracted from the previous search results log, and control is passed to operation 320. The extraction of content from the search results log may be performed according to various methods, as described herein. In at least one embodiment, the number of entries returned, and/or the fields returned to the viewer may be limited. For example, if the number of search process record(s) 200 is large, a limited number of records may be returned to the viewer of the GUI 298 (FIG. 2A). Control is passed to operation 320 and method 300 continues.

In operation 320 the content to be returned is sorted by the field(s) determined in operation 310. For example, the entries of the log pertaining to the keyword "NCAA Basketball" are arranged together while entries pertaining to the keyword "NCAA Football" are arranged together, for example, one after the other, without interruption from other entries relating to other keywords. Control is passed to operation 325 and method 300 continues.

In operation 325 the sorted content per the request received in operation 305 is returned to the viewer application, control is passed to operation 305 and method 300 continues.

For example, if a reviewer is interested in entries in the previous search results log pertaining to the keyword, "NFL Football," the reviewer can use a scroll bar (for example, scroll bar 296 (FIG. 2A) to scroll up and down the log to locate entries pertaining to the keyword, "NFL Football". As there may be many log entries and multiple entries associated with a given keyword, the GUI 250 may become cumbersome for the reviewer. However, a detailed record, such as that illustrated in FIG. 2A (which may also contain hyperlinks, etc.) could be very useful for reviewers desiring to view a search process record(s) in detail to evaluate performance of one or more participants in a session associated with a search process record 200.

Figure 4:
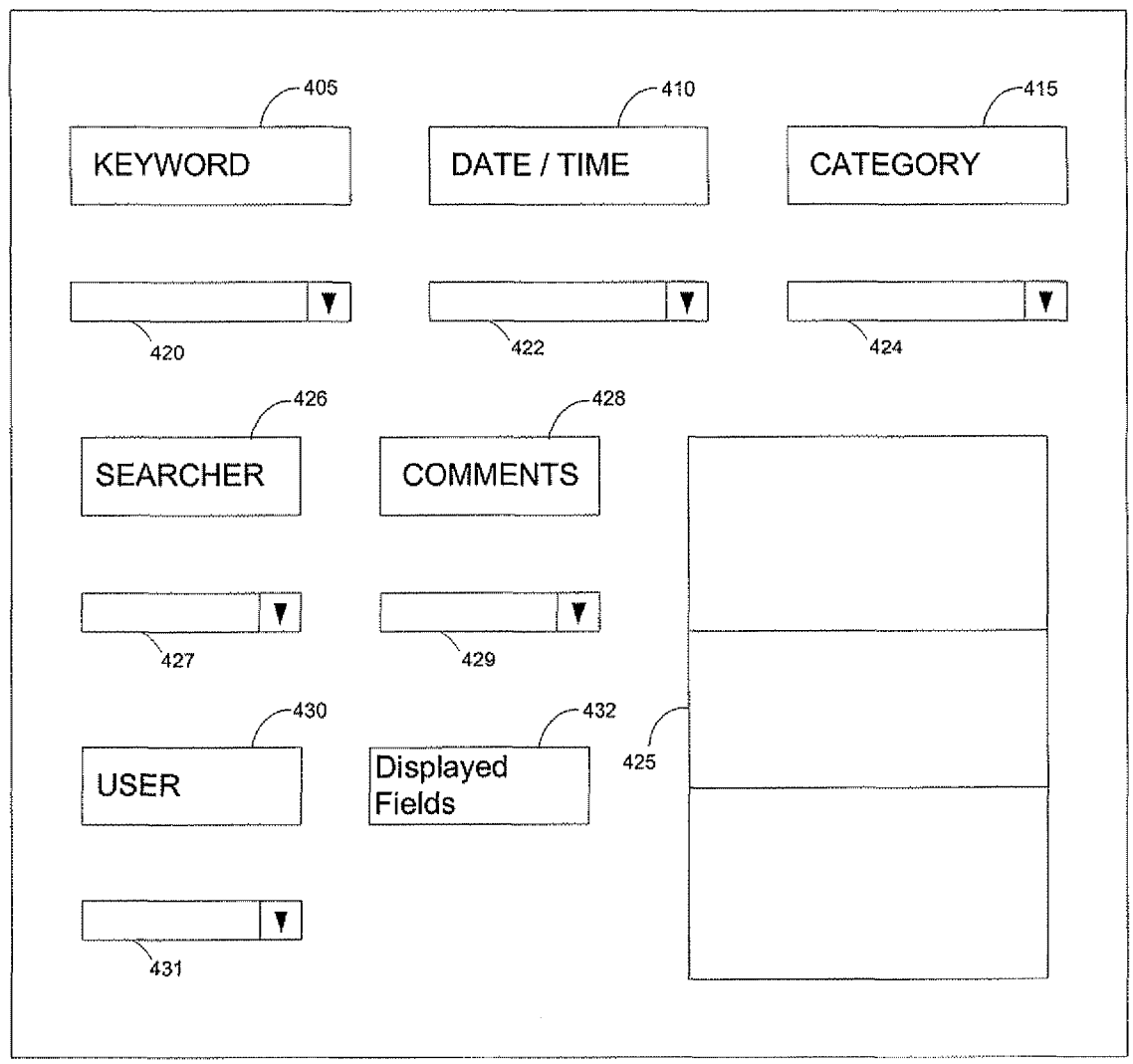
FIG. 4 is a diagram illustrating a graphical user interface for selecting a viewing format for a search process log or elements thereof.

As illustrated in FIG. 4, the GUI 400 illustrates an alternative embodiment to the GUI 250 (FIG. 2A). This embodiment may be utilized to review either a lesser number of records, a subset of the contents of the records, records containing a specific element, and/or combinations thereof.

In such an embodiment, before a viewer activates a viewing format for example, by activating the electronic button 405, the viewer can enter text pertaining to a keyword in a data entry box (e.g., 420).

For example, if the viewer desires to view the previous search results log 280 records relevant to the keyword "NBA Basketball", the user can enter the text "NBA Basketball" in the data entry box 420. In such an instance, after depressing the electronic keyword button 405, the user may be presented with information contained in the search process record(s) of the previous search results log 280, which includes only the entries pertaining to the keyword "NBA Basketball". The information may be presented in the display window 425 of the GUI 400

The embodiment described in conjunction with FIG. 4 allows the viewer to "zero-in" on a specific desired keyword and can eliminate the need to scroll up and down the log.

Likewise, a reviewer may elect to further reduce the number of records of interest. The text entry boxes 420, 422, 424, 427, 429, 431 along with the selection buttons 405, 410, 415, 426, 428, 430 may be implemented to allow the reviewer using the viewer to narrow the number of records and/or the content of the search process record(s) displayed.

The data entry boxes are preferably implemented as drop-down menus which may allow a reviewer to select for example, a category, a range of time, one or more keywords, a searcher, a user, etc. Likewise, the displayed fields box 432 may display a list of formats for data (e.g., query, results, searcher ID, start time) and/or lead to a "check box" menu with a list of available information fields which may be viewed or suppressed.

It should be noted that after being presented with the disclosure herein, one of ordinary skill in the relevant art will realize that any information recorded in the search system database 170 (FIG. 1) may be used to select information from the previous search results log 280 (FIG. 2B). For example, search result(s) associated with the keyword "NBA Basketball" produced by 'Searcher Bob' between 'Oct. 1, 2005 and Nov. 1, 2006' might be displayed in the window 425.

Figure 5:
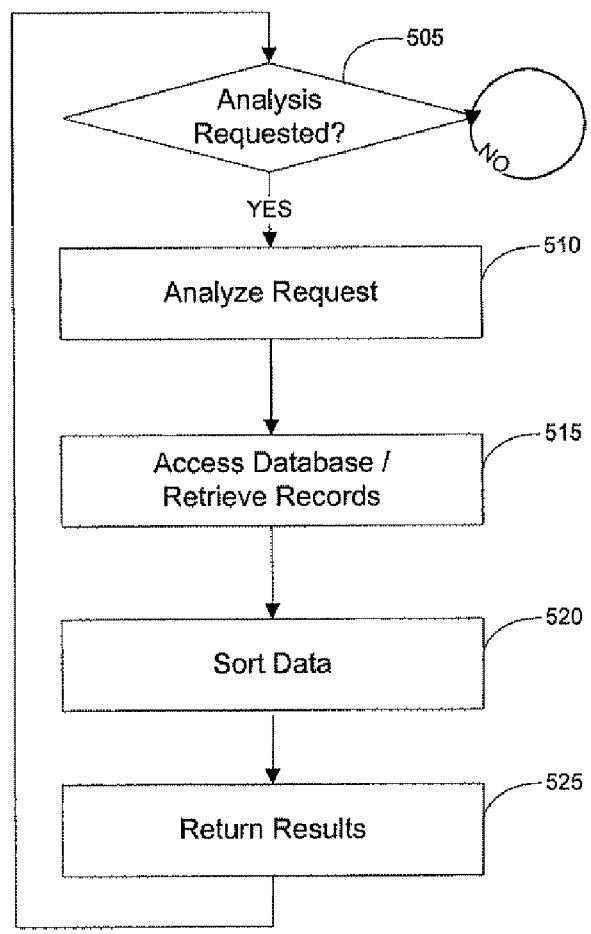
FIG. 5 is a flow diagram.

FIG. 5 illustrates a flow diagram for an alternate method 500 for accessing content of the previous search results log. The embodiment described in FIG. 5 allows a viewer to view a specific section of the previous search results log relating to the a keyword, for example, in which the viewer is interested, thereby minimizing or preventing scrolling up and down. Likewise, it may be used to extract records which are sorted in a particular order and may contain a reduced set of information from the search process record.

In operation 505, a determination is made regarding whether a previous search results analysis is requested. For example, in at least one embodiment an action button such as keyword button 405 (FIG. 4) in GUI 400 is selected, thereby indicating to the system 100 (FIG. 1) that a previous search results log analysis is requested. If it is determined that a previous search results log analysis request has not been received, method 500 continues to wait. If it is determined that a request has been received, control is passed to operation 510 and method 500 continues.

In operation 510, information pertaining to a previous search results log analysis request is extracted from the request. For example, in at least one embodiment, if the viewer desires to sort according to a particular keyword, for example, the user can enter the text of the keyword "NCAA Basketball" thereby allowing the system 100 (FIG. 1) to receive the target data. The analysis request might further include a sorting order and sorting criteria for the record(s) extracted from the previous search results log 280 (FIG. 2B) containing the targeted information. This information may be parsed from the analysis request received in operation 505. Control is passed to operation 515 and method 500 continues.

After parsing the information from the analysis request, in operation 515, the search system database 170 (FIG. 1) is accessed and records pertaining to the content requested in the analysis request are retrieved. Control is then passed to operation 520 and method 500 continues.

In operation 520 the information contained in the records obtained from the previous search results log 280 (FIG. 2B) is sorted as specified in the request received in operation 505. Control is passed to operation 525 and method 500 continues.

In operation 525 the information is returned to the requester formatted as requested in the analysis request received in operation 505. Control is passed to operation 505 and method 500 continues.

Figure 6:
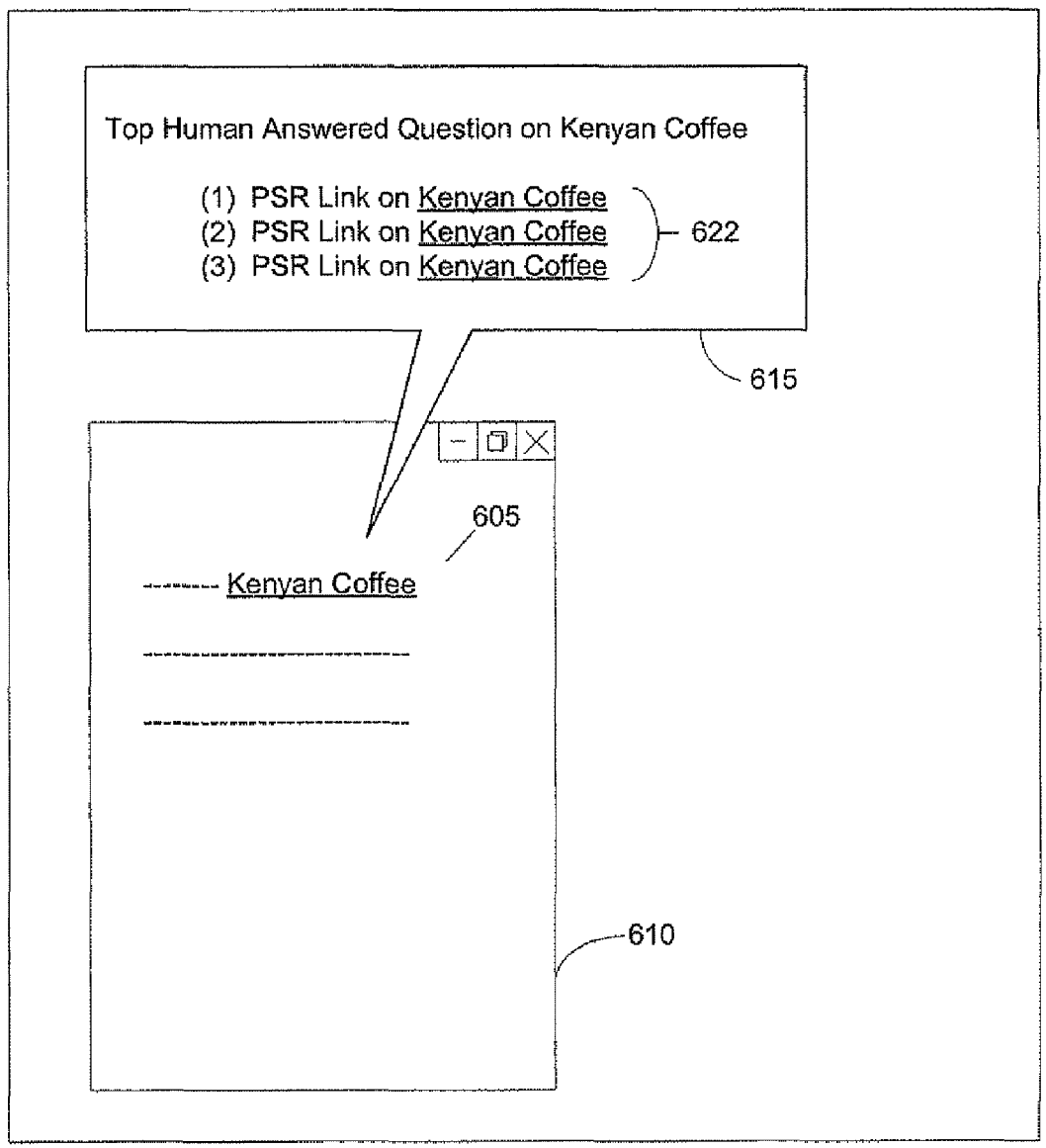
FIG. 6 is an illustration of the interaction of a previous search results log with dynamically linked webpage text.

FIG. 6 illustrates a block diagram 600 of a configuration in which information included in the previous search results log can be linked to and pointed to by contents of a webpage.

In at least one embodiment, information related to content in the entries in the previous search results log 280 can be displayed in a pop-up window 615 and can be linked to text appearing on a webpage (initial information), for example, the text on webpage 610. In such a feature, relevant, human-compiled search engine data (e.g., queries, resources, results, etc.) may be dynamically inserted within a webpage via a dynamic HTML pop-up layer screen displayed when placing or hovering a mouse cursor over a keyword or keyword phrase 605 on a publisher's webpage 610, for example.

The dynamically generated page on the publisher's website may contain links correlated with words or phrases, which correspond to keywords, categories, queries, etc. associated with information contained in the previous search results log 280. For example, the website of a pharmaceutical company might contain links associated with the names of various medications that were available from that company. Those names would be keywords in the search system, and when those links were clicked or rolled over, resources from the previous search results log, such as user testimonials, links to educational materials on the proper use of the medication, etc. could be accessed. Similarly a website of a used car dealership might contain the make, model and year of production of the available stock. Those data (e.g., 2003 Ford Mustang convertible) could be keywords in the search system and when activated would allow the user of the website to access search results, or resources relating to that make and model.

As the page is dynamically generated for a visitor's browser by the publisher's web application, the application accesses content of the embodiment provider's previous search results log (additional information) that may contain keywords, categories, queries, etc. corresponding to the words and/or phrases and links 620 to human selected resources and/or results regarding the phrase or words linked on the publisher's pages.

The seeding of the website can be done using various scripting language methods such as Java®, XHTML, ActiveX or other types of interactive, dynamic scripting languages and any other facility that allows dynamic linking of elements within a webpage. The website provider only needs to implement a suitable linkage. For example, a supplier (such as the automobile dealership mentioned above) might elect to purchase targeted advertising associated with keywords of the search system provider. As part of that process, suitable data (e.g., URL, command formats, widgets, etc.) can be provided to the dealership for dynamically linking to the previous search results log. This is exemplary and other extensions can be inferred from this disclosure by one of ordinary skill in the relevant art.

If a website visitor places a mouse cursor over the keyword phrase or keyword 605, the dynamic HTML layer screen may display for example the top three queries relating to the keyword and a hyperlink to the top search result(s) in a hierarchical order. A dynamic HTML layer screen may also display an advertisement(s) targeted to the keyword or phrase. Thus, after the search process information produced by at least one human search is stored in a previous search results log, access to at least one entry in the log is received in response to a user activating a hyperlink presented when a user activates webpage text related to information included in the search entry.

Figure 7:
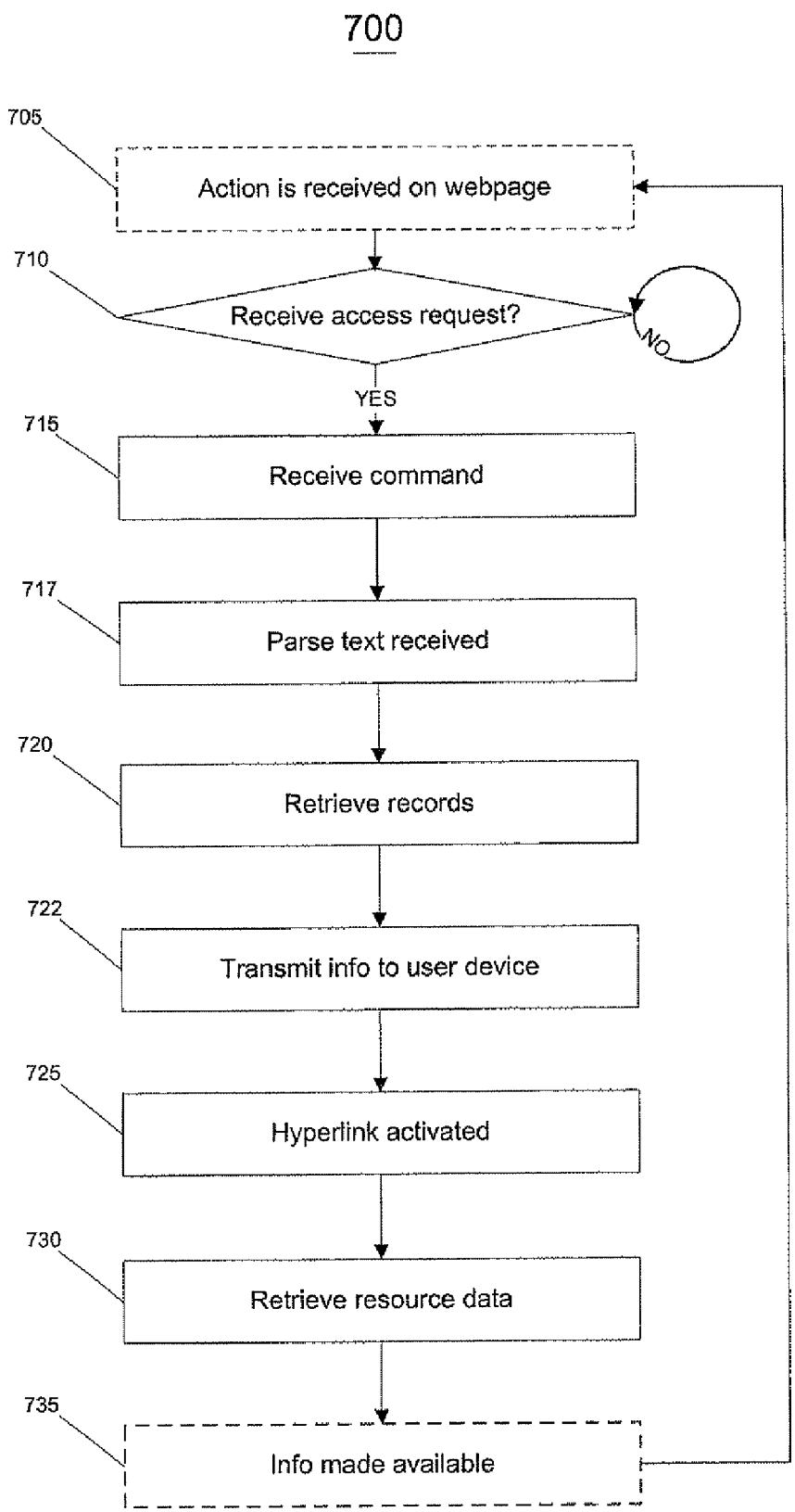
FIG. 7 is a flow diagram.

As illustrated in FIG. 7, a method 700 of operating the embodiment depicted in FIG. 6 is provided. In at least one embodiment, such a method can include receiving access to information included in the previous search results log in response to an action related to initial information such as text on a webpage and allowing information to be retrieved from the previous search results log which may be displayed on the webpage as illustrated in FIG. 6.

In operation 705, at the webpage being viewed on a user device (e.g., computer system 102 (FIG. 1)), action relating to text on a webpage is detected. For example, in at least one embodiment, an indication that a mouse cursor has crossed over text on a webpage is received. In particular, a viewer of a webpage may place his or her mouse cursor over text appearing on a webpage. In at least one embodiment, the text may be highlighted to indicate that it is "hot" or capable of being activated. If action is detected, an access request is sent to the system containing the search log. The request can include a pointer to the system containing the search log, a search command(s), text associated with the link on the webpage, a sorting criteria, a viewing format, etc. to facilitate access to the information in the search system database 170 (FIG. 1). Control is passed to operation 710 and method 700 continues.

In operation 710, a determination is made whether an access request is received via, for example, a URL pointer. For example, upon activating the text in operation 705, an access request via a URL pointer directed to the previous search results log is received. If it is determined that an access request has not been received, method 700 continues to wait for an access request. If it is determined that an access request has been received, control is passed to operation 715 and method 700 continues.

In operation 715, a command is received and parsed by the server 118 (FIG. 1). For example, a request might be received to return queries, search results, and resources associated with the keyword "NBA Basketball" which are sorted in order of ranking. The ranking being based upon viewing of the results by users in the last 10 hours. In at least one embodiment, the text is contained in the link displayed to the user in the webpage (e.g., webpage 610 (FIG. 6)). Control is passed to operation 720 and method 700 continues.

In operation 717, a keyword(s) may in at least one embodiment be parsed from the text received in the command received in operation 715. This operation may be performed if there is no existing keyword in the search system database which matches the content of a "keyword selection" command. Control is passed to operation 720 and method 700 continues.

For example if the phrase 'email marketing practices in southern India' was submitted as a keyword, the system might determine that there were no search results associated with that keyword. In such a case, the system might elect to return search results associated with the keyword 'email marketing practices' as that was the closest match to the keyword, based on the data available in the search system database 170 (FIG. 1) according to the keyword matching method employed in the search system.

Using another example, the received text can be compared with available keywords in the previous search results log in an attempt to locate a keyword most pertinent to the text. For example, in at least one embodiment the log header includes a list of all available keywords. In such an instance, the 'Kenyan coffee' text may be compared with available keywords, "instant coffee" and "fine coffee". As "fine coffee" may be determined to be more relevant to the 'Kenyan coffee' keyword than 'instant coffee', the keyword "fine coffee" would be identified as the most pertinent keyword. This parsing and taxonomy can be accomplished by various methods, as described in a related patent application U.S. application Ser. No. 11/647,286 entitled, "Automated Tool for Human Assisted Mining and Capturing of Precise Results", by Scott A. Jones, filed Dec. 29, 2006 and related U.S. Provisional Application Ser. No. 60/807,421 entitled, "Method and System for Qualifying Keywords in Query Strings", by Scott A. Jones, filed Jul. 14, 2006. incorporated herein by reference. Alternatively, the received text can be compared to text in the keyword field of each entry of the previous search results log in an attempt to identify a keyword most pertinent to information relating to Kenyan coffee, that is, matching or partially matching the received text.

In operation 720 records matching the selection criteria in the request received in operation 710 are retrieved from the previous search results log 280 (FIG. 2B). The records selected may then be sorted according to a sorting criteria contained in the request. The data of the records is formatted according the viewing format contained in the request, and the results are returned to the requester system. Control is passed to operation 722 and method 700 continues.

In operation 722, the information from operation 720 is received by the requesting system (e.g., the user computer system 102 (FIG. 1)) and a pop-up window may be displayed on the same page that includes the text of the webpage on the user's device. In at least one embodiment, a hyperlink to the first entry located by operation 720 (FIG. 7) is displayed in the pop-up window, along with other hyperlinks corresponding to information sent by the system in operation 720 in response to the request received in operation 710. For example, if the text on the webpage pertains to the keyword "Kenyan coffee", a hyperlink(s) pertaining to the keyword "Kenyan coffee" may be displayed in the pop-up window. The user can then activate or "click-on" one of the links to access the resources pointed to by the hyperlink(s). Control is passed to operation 725 and method 700 continues.

In operation 725, an indication that a hyperlink included in the pop-up window has been activated is received by the system from the user device. For example, in at least one embodiment, the viewer of the pop-up window activates a hyperlink with a mouse click to obtain information associated with a previous search results log entry. Control is passed to operation 730 and method 700 continues.

In operation 730, a resource to which a hyperlink connects is retrieved in preparation for display to the viewer of the webpage and sent to the user device. Control is passed to operation 735 and method 700 continues.

In operation 735, at the user device, the information in the retrieved resource is made available. Control is passed to operation 705 and method 700 continues.

Alternately, in at least one embodiment, the user might be allowed to select text or other elements on the web-page and submit that information as part of an access request to the search system. The alternate embodiment may be desirable, as it allows essentially arbitrary queries to be formulated by a user of a website. But it may also be undesirable for the webpage provider as the webpage provider has less control over the type of information which may be returned to the user device (e.g., computer system 102 (FIG. 1)).

Figure 8:
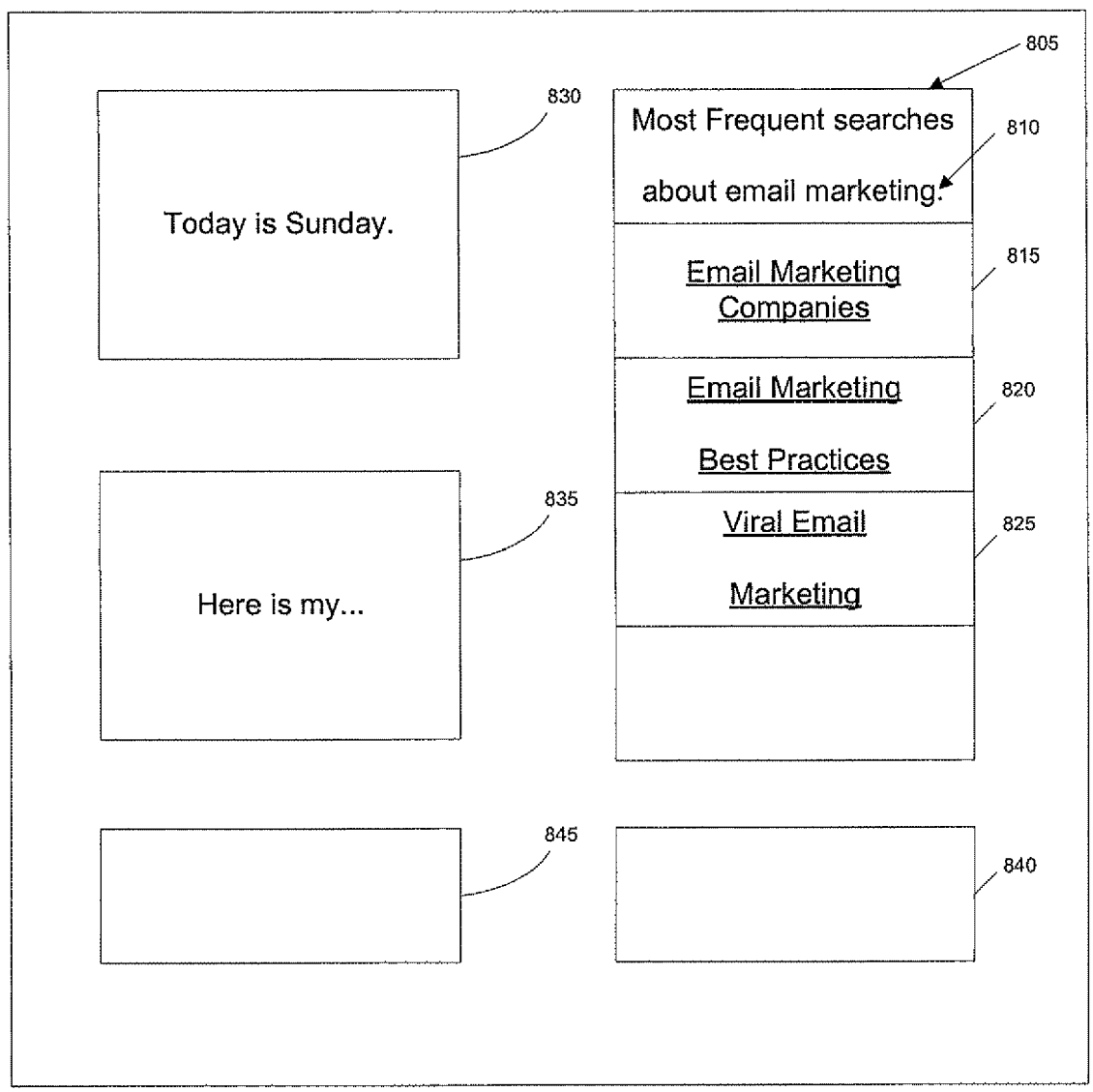
FIG. 8 is an illustration of a display screen for a graphical user interface (GUI) of a blog which interacts with a previous search results log.

In at least one embodiment, the previous search results log 280 (FIG. 2B) can be employed in conjunction with an electronic diary such as a web log or blog. As illustrated in FIG. 8, blog 800 is a website representing the personal log or diary, for example, of an Internet user.

For example, the blog 800 can include a first reply section 830, a second reply section 835, and an electronic sponsorship button 845. The first reply section 830 and second reply section 835 can include responses from a first and second visitor of the blogger's website.

The sponsorship button 845 can be used by a visitor to the blog to indicate that the visitor wishes to be sponsored by the blogger to become a human searcher in the search system. For example, the sponsorship button 845 may link to a membership application webpage for the search service disclosed in U.S. patent application Ser. No. 11/336,928 previously mentioned.

Electronic links, buttons, and icons can be located on the blog 800, as known in the art or described below. For example, an advertisement icon 840 can be located on the blog 800. In such an embodiment, a website of an advertiser on the search service can be advertised through the advertisement icon 840.

In addition to the components described above, the blog 800 can include a feature which may be known as a 'Most Frequent Queries' list such as list 805, for example. As is illustrated in FIG. 8, the 'Most Frequent Queries about Email Marketing' list 805 can include a header caption 810, for example, "Most Frequent Searches about Email Marketing". The list 805 can include for example, "Email Marketing Companies" hyperlink 815, an "Email Marketing Best Practices" hyperlink 820, and a "Viral Email Marketing" hyperlink 825. These phrases correlate with search queries that are stored in the database. The queries could for example be those ranked highest according to popularity or other ranking from for example, users who submit queries to the search system.

Each of the hyperlinks 815, 820, 825 may be generated automatically based upon an analysis request generated for example from the text in the header caption 810. The associated hyperlink(s) may allow a visitor of the blog 800 to access a corresponding entry or entries located in the previous search results log 280 for example the highest rated search result(s) and/or resources pertaining to the relevant subject in the text link. For instance, a visitor selecting the "Email Marketing Companies" hyperlink 815 might gain access to entries in the previous search results log 280 relating to search results or resources pertaining to companies that provide email marketing services.

Figure 9:
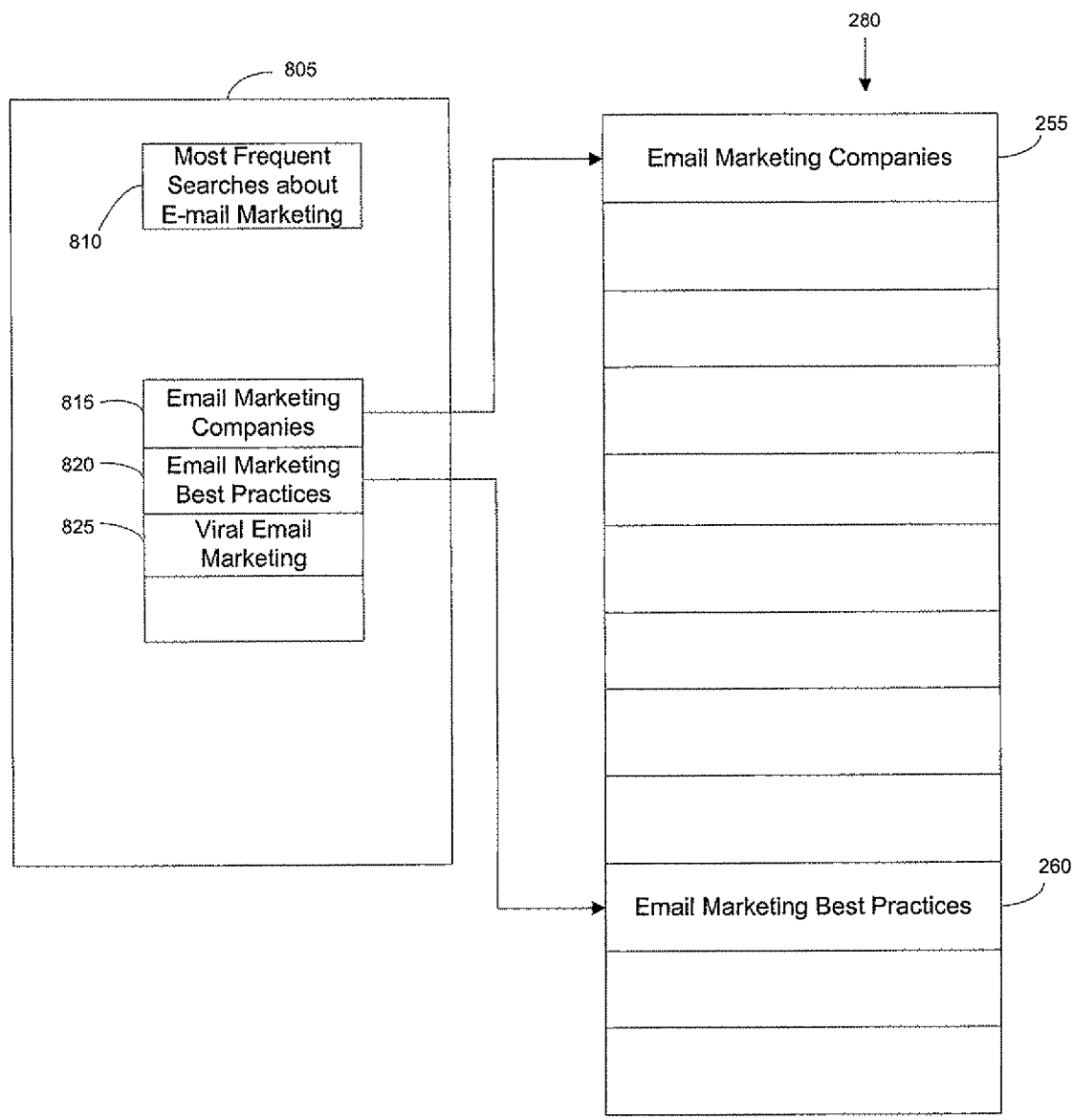
FIG. 9 is a block diagram illustrating the interaction between a blog and a previous search results log.

As illustrated in FIG. 9, in at least one embodiment, the blog 800 includes hyperlinks to the previous search results log 280. Information pertaining to the hyperlinks on a blog, for example, can be indexed in the search results of the previous search results log to allow the blog to be linked to content associated with a search process record(s). The information may be identified by a keyword related to information pertaining to the text of the hyperlink. In such an embodiment, for example, each of the hyperlinks included in the "Most Frequently Asked Questions about Email Marketing" list can correspond to entries in the previous search results log 280 relating to the subject or topic of a particular hyperlink.

As an example, a visitor of the blog 800 can activate the "Email Marketing Companies" hyperlink 815 to gain access to entries in the previous search results log 280 associated with the keyword, "Email Marketing Companies". As a result, a visitor of the blog is able to receive access to results provided by a human searcher (e.g., information from the search process record 255), as the information pertaining to email marketing companies from the previous search results log 280 (FIG. 2B) was created by at least human searcher(s) or guide(s).

Similarly, a visitor to the blog 800 might activate the "Email Marketing Best Practices" hyperlink 820 to gain access to, for example, search results, such as those in search process record 260 (FIG. 2A) which is associated with the keyword "Email Marketing Best Practices". Any hyperlinks on the blog 800 may be pointed or linked to other search results entries in a similar manner.

Figure 10:
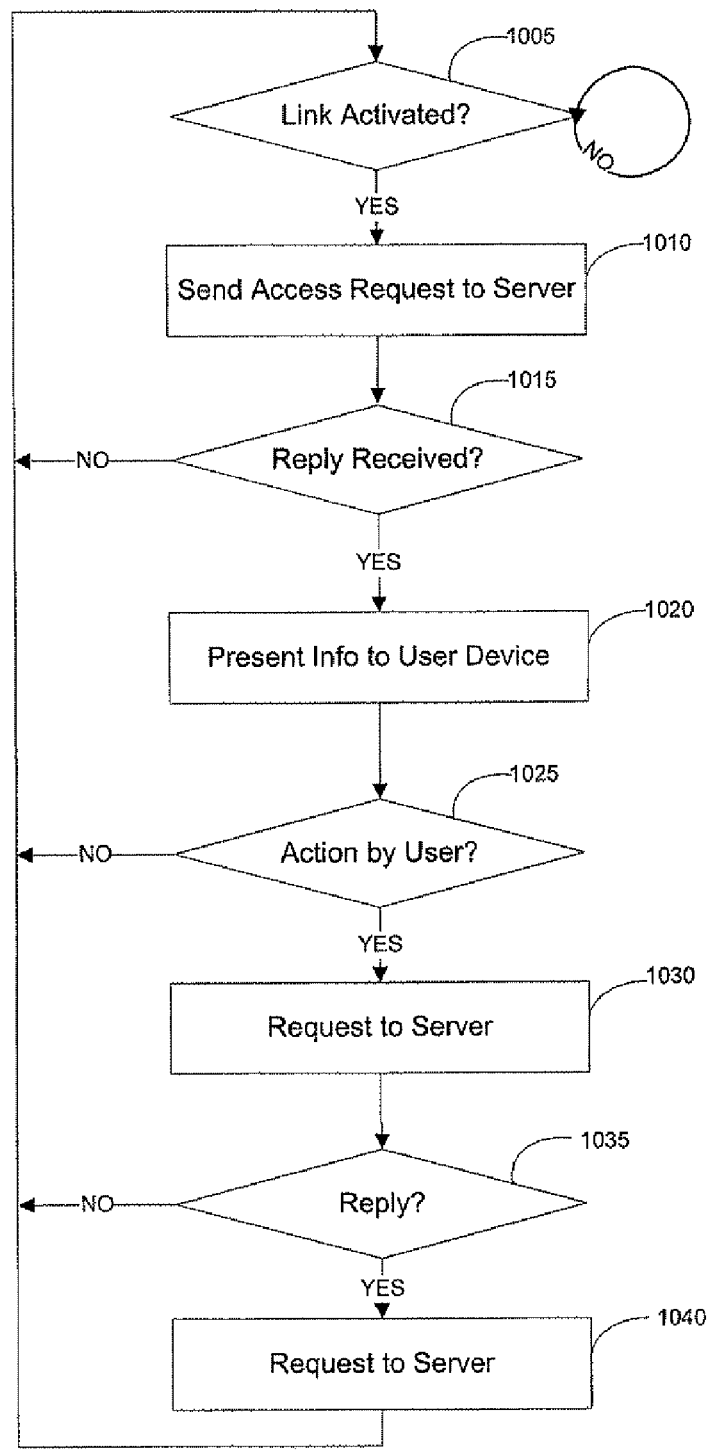
FIG. 10 is a flow diagram illustrating a method for obtaining access to a previous search results log for a blog website from the blog server perspective.

FIG. 10 is a flow diagram illustrating a method 1000 for accessing the previous search results log from a blog website from the blog website perspective according to at least one embodiment.

In operation 1005, activation of a hyperlink is detected at the blog. For example, in at least one embodiment, access is received from a visitor to the blog clicking on a hyperlink under the "Most Frequent Searches about Email Marketing" header 810, for example. Control is passed to operation 1010 and method 1000 continues.

In operation 1010, at the system containing the search log, access request is received via, for example, a URL pointer corresponding to a hyperlink activated on the blog. For example, after the user activates a hyperlink, access is directed to the previous search results log via a URL such as, http://www.company.com/webpage/Previous-SearchResultsLog. An access request is sent to the system containing the search log, and the request includes a pointer to the search log, a search command(s), text, etc. associated with the hyperlink, as previously discussed herein. Control is passed to operation 1015 and method 1000 continues.

In operation 1015 a determination is made by the user device acting as the blog server whether a reply from the search system (e.g., server 118 (FIG. 1)) is received. If it is determined that a reply has not been received, method 1000 may wait until a time-out condition is detected. If the time-out is detected, actions such as re-sending the request may be taken, and control is passed to operation 1005 and method 1000 continues. If it is determined that a reply has been received, control is passed to operation 1020 and method 1000 continues.

In operation 1020 information received from the system providing the previous search results log is presented on a user device (e.g., computer system 102 (FIG. 1)). Control is passed to operation 1025 and method 1000 continues.

In operation 1025 a determination is made whether a user action has been detected at the user device which relates to the information received from the search log provider in operation 1020. If an action is detected control is passed to operation 1030 and method 1000 continues. If no action is detected, method 1000 may wait until a time-out condition is detected, take defined actions, such as closing a pop-up window, etc. and control is passed to operation 1005 and method 1000 continues.

In operation 1030 a request may be sent to the search system server to access resources indicated in the action related to the information provided in operation 1020. Control is passed to operation 1035 and method 1000 continues.

In operation 1035 a determination is made by the user device acting as the blog server if a reply from the search system (e.g., server 118 (FIG. 1)) is received. If it is determined that a reply has not been received, method 1000 may wait until a time-out condition is detected. If the time-out is detected, actions such as re-sending the request may be taken, and control is passed to operation 1005 and method 1000 continues. If it is determined that a reply has been received, control is passed to operation 1040 and method 1000 continues.

In operation 1040 information received from the search system server in operation 1035 is presented to the user device, control is passed to operation 1005 and method 1000 continues.

Figure 11:
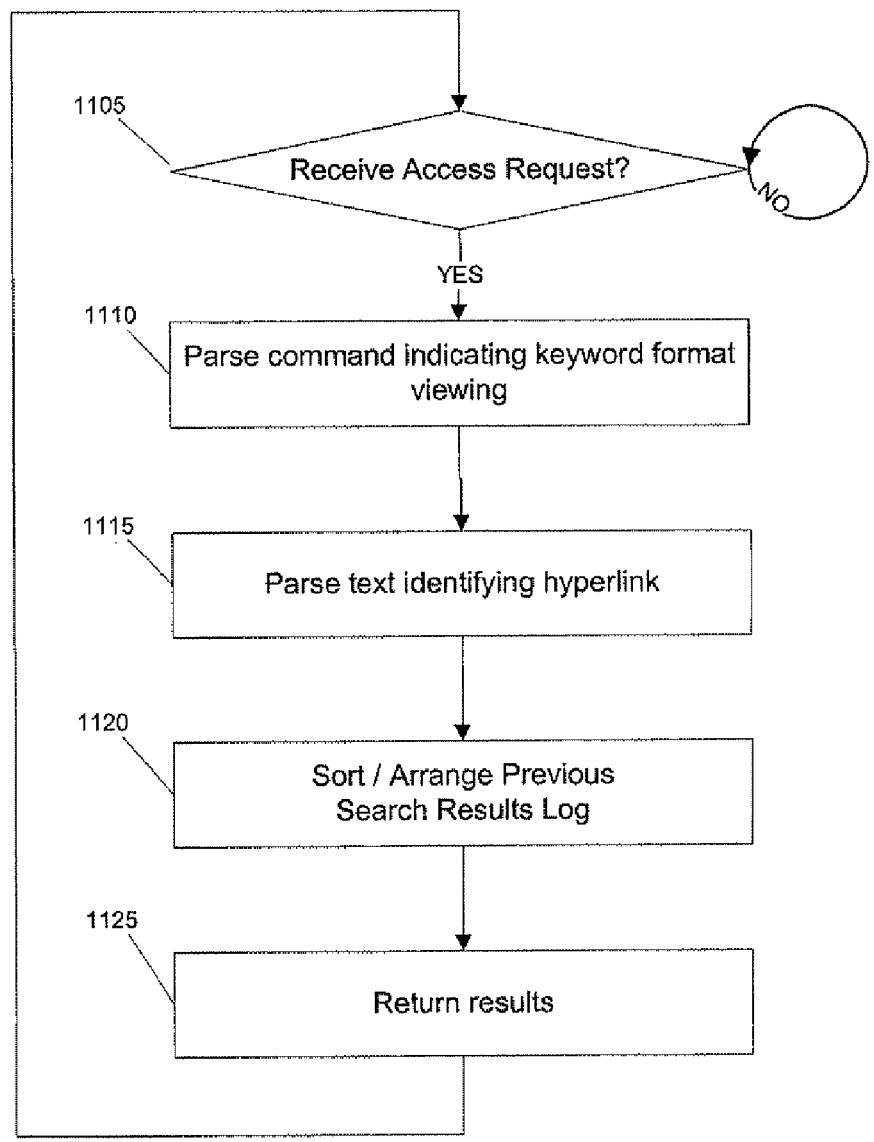
FIG. 11 is a flow diagram illustrating a method for providing access to a blog website from the previous search results log server perspective.

FIG. 11 is a flow diagram illustrating a method 1100 for providing access to the previous search results log to a blog website from the previous search results log server perspective according to one embodiment.

In operation 1105, a determination is made at the system including the previous search results log, whether an access request to the previous search results log is received via, for example a URL pointer related to a hyperlink activated on the blog website. If it is determined that an access request has not been received, control remains at operation 1105 and method 1100 continues. If it is determined that an access request has been received, control is passed to operation 1110 and method 1100 continues.

In operation 1110, at the system including the previous search results log, a command indicating keyword format viewing, for example, is received from the blog website. Processing of the request received from the device acting as the blog server is performed as previously described herein. Control is passed to operation 1115 and method 1100 continues.

In operation 1115, information based upon the request received in operation 1105 is retrieved from the previous search results log 280. For example, results relating to the keyword "email marketing best practices", may be retrieved. Control is passed to operation 1120 and method 1100 continues.

In operation 1120, at the system including the log, the previous search results log is sorted or arranged according to the information contained in the access request received in operation 1105. The information may be formatted as indicated in the access request. Control is passed to operation 1125 and method 1100 continues.

In operation 1125, information related to the request is transmitted to the blog server, control is passed to operation 1105 and method 1100 continues.

Figure 12:
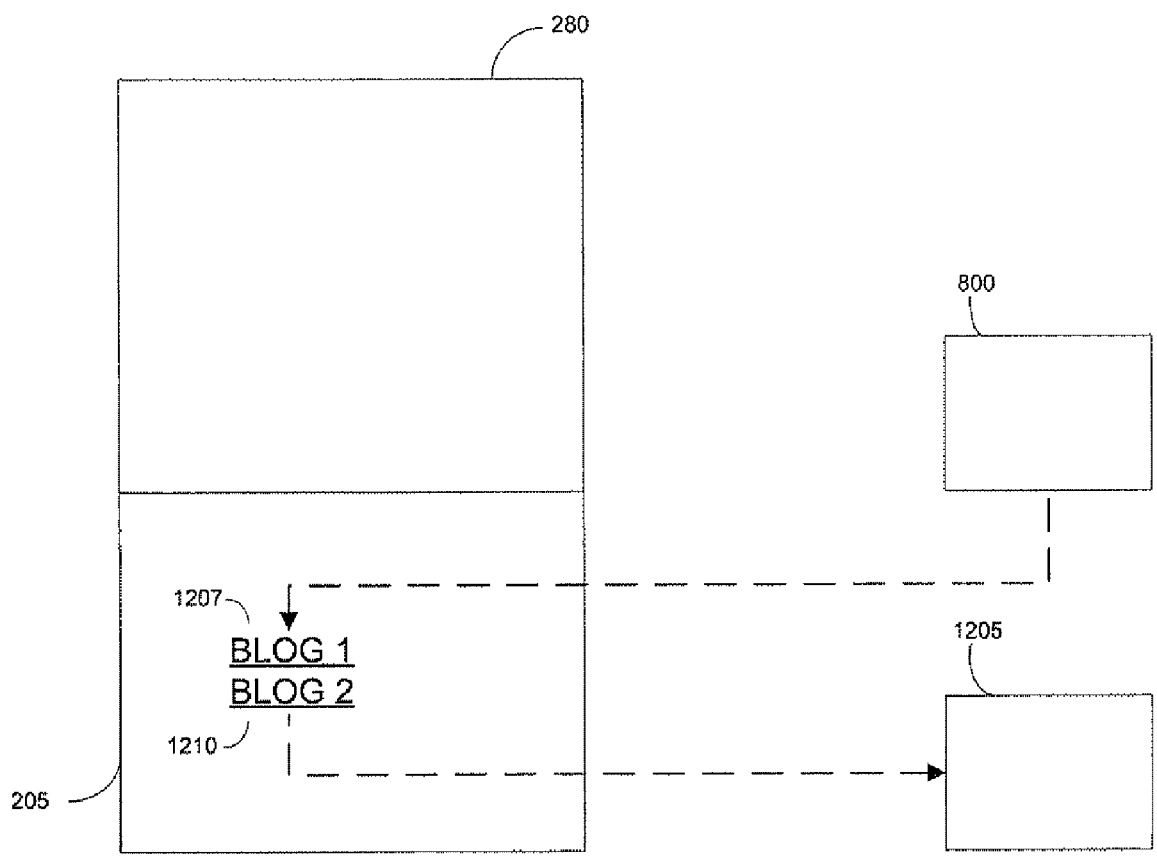
FIG. 12 is a diagram illustrating access links between blogs from a previous search results log.

FIG. 12 illustrates an interrelation between the previous search results log 280 and blogs 800 and 1205. For example, this interrelationship may allow the embodiments described herein to provide a more global approach to information sharing. For example, in addition to providing an information seeker with search results produced by human searchers, the information related to a keyword or other information in an access request can encompass other information sources such as information stored on blogs of personal users. In such an embodiment, a hyperlink to a website, for example, a blog, providing access to a particular "Most Frequent Searches" list corresponding to the content of a particular viewed entry of the previous search results log can be added to a field in a search process log (e.g., a related blogs field) to allow a user of the previous search results log to access the corresponding website. In particular, a human searcher viewing information contained in the previous search results log 280 may access a search process record 255 via "blog 1" hyperlink 1207, for example, and gain access to the search process record 255 from blog 800. When viewing information related to the search process record 255, the "blog 2" hyperlink 1210 may be presented to a user. Using the "blog 2" hyperlink 1210, the user may gain access to blog 1205.

Thus, although the searcher or user may not have had knowledge of the blog 1205, the human searcher is introduced to the blog 1205 via the information provided in the previous search results log 280. As a result, a user or searcher can visit the blog 1205 to obtain information that he or she may not have been able to obtain otherwise from blog 800, for example.

Figure 13:
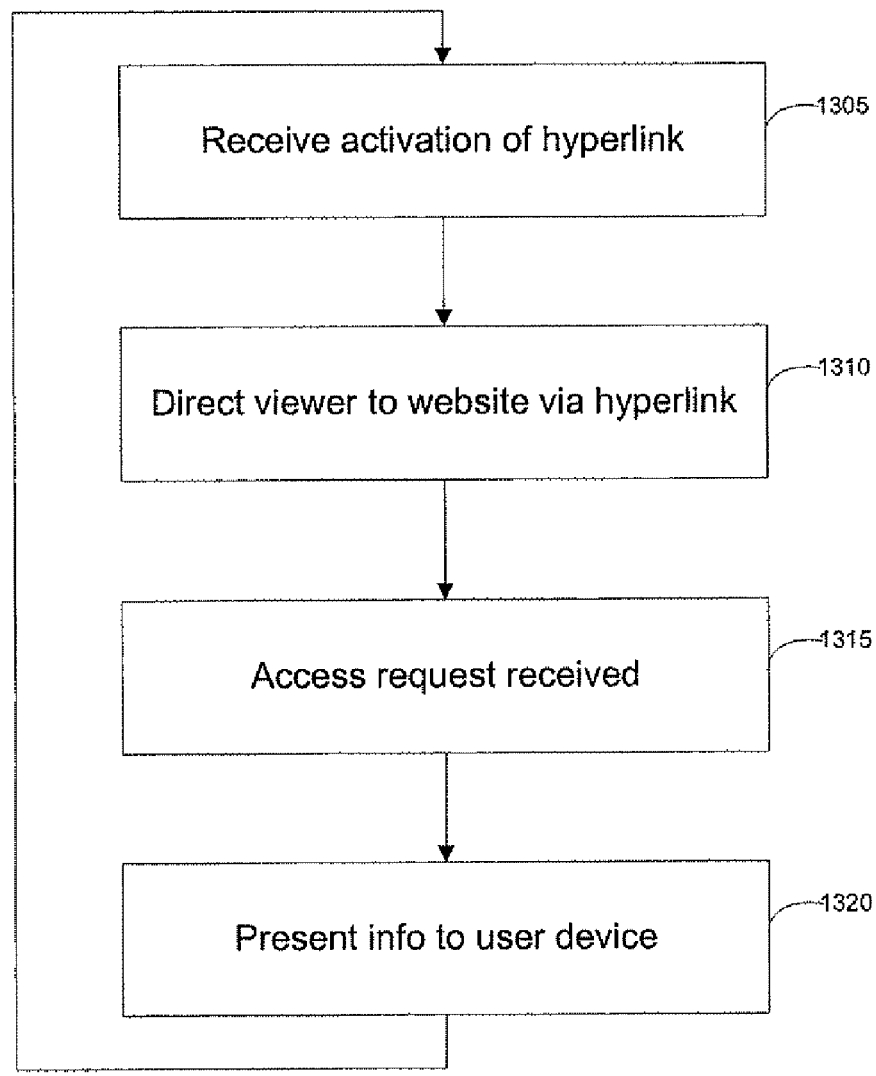
FIG. 13 is a flow diagram of a process for accessing a website from a hyperlink in the previous search results log.

FIG. 13 illustrates a process 1300 for accessing a blog (e.g., blog 1205) from a link provided on a different blog (e.g., blog 800) via a previous search results log.

In operation 1305, activation of a hyperlink connecting a blog to the search system providing the previous search results log 280 is received. For example, in at least one embodiment, a user clicks on the hyperlink located in a blog (e.g., blog 800), thereby activating the hyperlink. Control is passed to operation 1310 and method 1300 continues.

In operation 1310, the viewer of a first blog (e.g., blog 800). is directed to a server of the provider of the previous search results log 280 via the hyperlink. For example, when the user clicks on the hyperlink, the user is then presented with a display of content of the search process record 255. Control is passed to operation 1315 and method 1300 continues.

In at least one embodiment, the previous search results log 280 includes a field such as "associated blogs," which identifies blog's associated with the particular keyword/category. Including the field in the log can allow changes to the blog identifiers to occur dynamically. In other words, if a new blog is identified which is relevant to a keyword or category, the blog may be added to the "associated blogs" field. When a user accesses a particular entry in the previous search results log (e.g., the search process record 255) pertaining to a keyword (e.g., 'email marketing'), the new blog (e.g., blog 1205) may be identified in the entry.

In operation 1315 the viewer of the information relating to the content of the previous search results log 280 (e.g., the search process record 255) activates the hyperlink or otherwise indicates an access request to the blog (e.g., a link to the blog 1205). Control is then passed to operation 1320 and method 1300 continues.

In operation 1320 the information of the new blog (e.g., blog 1205) is presented to the user via the user device (e.g., system 102 (FIG. 1). Control is passed to operation 1305 and method 1300 continues.

Thus a user of the blog 800 may obtain access to the related blog 1205 using the associations created by a human searcher(s) in the previous search results log 280.

The cross-referencing of the search results log 200 with a blog provides a particular advantageous benefit that would be apparent to one of ordinary skill in the relevant art after being presented with the disclosure herein. For instance, utilizing the 'most frequent queries' list 805 (FIG. 8), the blogger of the blog 800 can utilize content from the previous search results log to generate revenue for his or her site by posting a captioned hyperlink section entitled, "Most popular questions relating to the keyword ZZZ," for example. In particular, when visitors of the blog 800 activate the hyperlinks pertaining to the popular questions, the visitor is provided with access to the previous search results log 280.

Similarly, after search results are stored in the previous search results log 280, search results represented by the entries included within the previous search results log 280 can be conventionally indexed by the other search engines. Thus, the data of search result(s), search query(ies), resources, ratings, advertisement(s), etc. can be accessed by users of a search engine(s). As a result, marketing of the search system that generates the search results can occur, thereby increasing user traffic to the search system.

For example, a user utilizing Yahoo!® to perform an information search, could possibly receive as a result of his or her search query a result represented in a previous search results log and any advertisements viewed by viewers of the previous search results log, thereby generating revenue for the search system that generates the search results in the search log, as well as raising awareness of the existence of the search system. It should also be noted that at least one advertisement link can be added to the information returned in response to an access request to the system providing the previous search results log 280.

Although examples involving the interaction of the embodiments described herein utilize blog's, webpages and/or independent search engines, for the purposes of illustration, one of ordinary skill in the relevant art will readily appreciate that other systems may interact with the embodiments described herein without departing from the spirit and scope of the embodiments described herein.

For example, a retail store offering golf shoes for sale could have a website including a "Frequently Asked Questions about golf shoes" list hyperlinked to information included in the previous search results log, for example. In such an instance, upon activating a hyperlink associated with a query/keyword (e.g., "what is the best Nike golf shoe?") a visitor of the store's website could be granted access to information included in a previous search results log which relates to a keyword(s) of the query (e.g., "Nike golf shoes") which might include search result(s) related to ratings of various Nike shoes, as well as advertisements (e.g., a video relating to Nike golf shoes), and might be offered the opportunity to interact with a guide(s) associated with the keyword. Similarly, a travel agency offering travel packages for sale could have a website including a 'Most popular European vacation destinations for seniors' list. The list might contain a list of vacation destinations based on results related to the keyword 'European Vacation destinations' which were produced, for example by guides with a demographic of having an age of 55+, or who are members of the AARP. In such an instance, upon activating a hyperlink for a specific destination, a vacationer would be granted access to information in a previous search results log pertaining to the destination which has been judged as relevant by human searchers with a demographic associated with the content of the request sent to the previous search results log by the "most popular" list appliance.

The embodiments described herein allow management and other authorized users of the search system to monitor progress of the human searchers in an effort to determine the effectiveness of the human searchers. For example, management may review a previous search results log entry such as the search process record 265 and determine that a human searcher associated with the record via information in the searcher ID field 208 are not performing effectively for a particular assigned keyword. As a result, the human searchers can be reassigned to other keyword(s), provided with training materials, etc. Further measurements of performance such as rating of results produced, time to obtain results for a user, etc. may be extracted from the previous search results log in order to monitor the actions of human searchers, and/or users based upon the information in the previous search results log 280.

Further a searcher or user may be able to add annotations to a search process record(s). Such annotations might include comments or advice on results or resources, ratings of results, such as those obtained by the weighted voting process described in the related Provisional Application U.S. Ser. No. 60/913,944, entitled, "Knowledge Vetting System and Method for Search Results", by Scott A. Jones, filed Apr. 25, 2007 which disclosure is incorporated herein by reference, or via other mechanisms. Data regarding the person(s) adding the annotations may be included in for example, a comments field along with time-related information in the chronological data field 222 (FIG. 2).

In addition, the embodiments described herein allow the human searchers to share information with each other regarding search strategies, for example. For instance, a newly promoted master guide may desire to improve his performance on a particular keyword. The master guide may access search process records associated with other human searchers assigned to the same keyword(s) in an attempt to learn about strategies employed by other more experienced elite guide(s), for example. Similarly, more experienced elite guides can add comments on the previous search results logs of the less experienced human searchers, as described above.

It should also be noted that the embodiments described herein can also be implemented in the form of a computer-readable storage encoded with processing instructions for controlling a computer to implement the methods described herein.

The many features and advantages of the embodiments are apparent from the detailed specification and, thus, it is intended by the appended claims to cover all such features and advantages of the embodiment that fall within the true spirit and scope of the embodiment. Further, since numerous modifications and changes will be readily perceived by those of ordinary skill in the art, it is not desired to limit the invention to the exact construction and operation illustrated and described, and accordingly all suitable modifications and equivalents may be resorted to while failing within the scope of the invention.

What is claimed is:

1. A computer-implemented method for providing access to a previous search result, comprising:
receiving a query submitted from a user requesting a human assisted search;
selecting at least one human searcher registered for a keyword of the query based on determination by a processor receiving the query submitted;
storing, in a computer-readable search process log, search process information produced by said at least one human searcher, said search process information including a search result provided by the at least one human searcher, the query, an identifier of the searcher, and an identifier of the;
receiving a request for access to the search process log from a source;
choosing the search process log based on content of the request and content of the search process log; and
presenting a portion of the search process log and selectively blocking access to an element of the search process log based on an identifier of the source and the identifier of the user.

2. The computer-implemented method of claim 1, wherein said storing includes recording said search process information as the search process information occurs in real-time.

3. The computer-implemented method of claim 1, wherein said presenting includes ranking the search process log according to a selected view format including one of a chronological order format, a keyword format, a category format, a title format, an abstract format, a query format, a searcher format, a user format and a comments format.

4. The computer-implemented method of claim 1, wherein said choosing includes ranking the search process log according to at least two viewing formats.

5. The computer-implemented method of claim 1, wherein said choosing includes ranking the search process log according to the at least one searcher.

6. The computer-implemented method of claim 1, wherein said choosing includes ranking the search process log according to a rating of the at least one searcher relative to other searchers registered to perform searches.

7. The computer-implemented method of claim 1, further comprising:
receiving a rating of an element of the search process log from at least one other human searcher based on a qualification of the at least one other human searcher.

8. The computer-implemented method of claim 1, further comprising, after said storing, receiving the request for access to the search process log from a search engine.

9. The computer-implemented method of claim 1, further comprising, after said storing, adding at least one advertisement link to the search process log.

10. The computer-implemented method of claim 1, wherein said choosing includes:
determining whether a search process log analysis is requested;
receiving a sort condition corresponding to a parameter stored in the search process log; and
displaying entries in the search process log sorted by the condition and the parameter.

11. The computer-implemented method of claim 1, wherein said selecting includes:
determining whether a search process log analysis is requested;
receiving text pertaining to the search process log analysis;
receiving a sort condition corresponding to a field of the search process log; and
displaying content of the search process log based on a ranking of the search process log for the field and the text.

12. A computer-implemented method for providing additional information relating to initial information, comprising:
receiving, using a processor, access to the additional information in response to an action related to the initial information, said additional information being included in a computer-readable search process log recorded based on a search conducted by the at least one human searcher registered for a keyword responsive to a request from a user for a human assisted search, said additional information including a search result of the searcher, an identifier of the request, an identifier of the searcher and an identifier of the user, and being supplied from the search process log responsive to a query including the initial information based on a ranking of the search process log associated with the initial information; and
allowing a portion of the additional information to be retrieved and presented, the portion being determined based on the action, the portion excluding an element of the additional information based on an identifier of a source of the action and the identifier of the user; and
presenting the portion of the search process log and selectively blocking access to an element of the search process log based on the identifier of the source and the identifier of the user.

13. The computer-implemented method of claim 12, wherein said receiving includes:
receiving access based on a Uniform Resource Locator; and
providing entry information from the previous search result, wherein the portion and the ranking are based on content of the Uniform Resource Locator.

14. The computer-implemented method of claim 13, wherein said receiving further includes:
receiving a command indicating keyword format viewing;
identifying a highest ranking keyword of the Uniform Resource Locator;
displaying a hyperlink corresponding to the search process log; and
displaying information of the search process log.

15. A computer-implemented method of receiving access to a search result from a website, comprising:
receiving, using a processor, a request for access initiated by activation of a hyperlink on the website; and
providing entries related to a keyword related to an information pertaining to the hyperlink, and
wherein the entries are indicated in a search process log recorded by a computer based on a human assisted search performed by a human searcher responsive to a query submitted by a user, the user requesting a response to the query, the response being produced by a person, the human searcher being selected based on the query and the search process log comprising an identifier of the user, an identifier of the searcher, an identifier of the query, and an identifier of the response, and
said information including a sorting based on a key indicated in the search process log, the keyword and an access right associated with the hyperlink wherein an access right is determined based on the identifier of the user and an identifier of a source of the information; and
presenting a portion of the search process log and selectively blocking access to an element of the search process loci based on the identifier of the source and the identifier of the user.

16. The computer-implemented method of claim 15, further comprising, after said receiving and before said displaying:
receiving a command indicating a keyword format viewing;
receiving text identifying a hyperlink;
determining the keyword based on the text identified by the hyperlink;
sorting the search process log according to the identified keyword, the key and a second key; and
locating an entry of the highest ranking search process log.

17. A computer-implemented method for providing information, comprising:
receiving, using a processor, a query requesting a response selected by a human assistant;
selecting a human searcher based on a selected keyword of the query;
storing an identifier of the searcher, an identifier of the selected keyword, an identifier of the response, and an identifier of a source of the query in a computer-readable search process log;
receiving, from an administrator, a request for access to the search process log including the identifier of the searcher;
ranking the search process log based on the identifier of the searcher and at least one other element of the search process log;
selectively blocking access to an element of the search process log based on the identifier of the source of the query and an identifier of the administrator; and
providing the search process log to the administrator in an order based on the ranking.

18. The computer-implemented method of claim 17, wherein the other element is at least one of the selected keyword, the identifier of the source of the query, a category of the query, and an identifier of a resource used by the human searcher to obtain the response.

19. A computer-implemented system, comprising:
at least one human searcher system transmitting information of a response to a query and a resource used to obtain the response;
a user device originating a query requiring a response of a person to be provided;
a server communicatively coupled to said user computer, said server selecting the human searcher system to receive the query; and
a search system communicatively coupled to said user device and said server, said search system receiving the query, the response, and the resource and recording an identifier of the user device, an identifier of the searcher system, an identifier of the query, an identifier of the response, and an identifier of the resource in a search process log in a database communicatively coupled with said server, and providing selective access to pre-determined content of the search process log based on a ranking of the search process log and access rights associated with a request for content of the search process log, the access rights being determined by the identifier of the user device and an identifier of the source of the request; and
wherein the search process log includes a rating, a selected keyword, a date when the log is created, a date when the log is updated and a comment by a person including one or more of another user, another searcher, and an administrator; and
presenting a portion of the search process log and selectively blocking access to an element of the search process log based on the identifier of the source and the identifier of the user.

20. A computer-readable storage medium causing a computer to execute an operation including providing a record of a search process, comprising:
selecting a human searcher to provide a reviewed search result responsive to a request of a user;
selecting, using a computer, the human searcher based on a ranking of the human searcher for a category of the request;
selecting the human searcher when determining that the human searcher is a highest ranking human searcher for the request and that the human searcher is accepting requests at the time the request is submitted;
storing search process information received from the user and the human searcher in a search process log, the search process log comprising an identifier of the user, an identifier of the request, an identifier of the human searcher, an identifier of the reviewed search result, and an identifier of the category;
selectively blocking access to an element of the search process log based on the identifier of the user and an identifier of a source accessing the search process log; and
presenting the reviewed search result in an order based on a ranking of the query and the search result for a keyword.

21. The computer-implemented storage of claim 20, wherein said storing of the search process information occurs in real-time.

22. A computer-implemented method for cross-referencing a previous search result with a blog, comprising:
receiving a query from a user requesting a human assisted search;
selecting, using a processor, at least one human searcher registered for a keyword of the query;
recording a search process log of a search conducted by the human searcher for a request from a user, the search process log comprising a search result reviewed by the searcher, an identifier of the human searcher, an identifier of the user, an identifier of a first blog from which the human searcher obtained the search result, and the query of the user;
providing a hyperlink in a second blog website;
receiving an access request based on activation of the hyperlink;
selectively blocking access to an element of the search process log based on the identifier of the user and an identifier of the source of the access request; and
providing access to the first blog based on a ranking of the search process log for elements of the search process log excluding the identifier of the first blog.

23. The computer-implemented method of claim 22, wherein said providing includes providing a hyperlink directed to a keyword or category of information stored in the search process log.

24. The computer-implemented method of claim 1, wherein said presenting is performed in response to a request from a client device.

25. The computer-implemented method of claim 1, further comprising, after said storing, adding at least one rating to the search process log.

26. The computer-implemented method of claim 1, wherein said presenting includes displaying a subset of one or more elements of the search process log based on the request for access.

27. A computer-implemented method of providing access to search process information, comprising:
maintaining, using a processor, a computer-readable search process log comprising an information of a search conducted by a human searcher as a result of a user submitting a query, said search process log including a response of the human searcher, the query, an identifier of the user, an identifier of the human searcher, and an indicator of a resource utilized by said at least one human searcher to produce the response;
selectively blocking access to an element of the search process log based on the identifier of the user and an identifier of a source of an access request; and providing access to the information of the search using a stored sorting key selected by the searcher and recorded in the search process log.

28. The computer-implemented method of claim 27, wherein said query is received from a portable device.

29. computer-implemented method of providing information, comprising:
selecting at least one human searcher registered for a type of request;
determining, using a processor, whether the human searcher accepts a request from a user;
obtaining information of a search performed by the searcher including a resource used to obtain a search result and the search result;
providing information of the search process to a second searcher, said search process information being stored in a computer-readable search process log comprising a search result of the searcher associated with the query of the user when determining that the second searcher has been selected to receive a second query of the user;

sorting the search process log among a plurality of search process logs based on a first predetermined value;

selectively blocking access to an element of the search process log based on an identifier of the user and an identifier of a source of an access request; and presenting the search process information to the second searcher in an order based on the sorting according to at least one of a category, a time stamp, a comment, a resource, and a searcher associated with the search process.

30. The computer-implemented method of claim 29, further comprising:

recording a modification to the information of the search process by the second searcher.

\* \* \* \* \*